US012763266B2

(12) United States Patent
Deprospo et al.

(10) Patent No.: US 12,763,266 B2
(45) Date of Patent: Oct. 13, 2026

(54) INTEGRATED PASSIVE DEVICES WITH ENHANCED FORM FACTOR

(71) Applicant: Saras Micro Devices, Inc., Chandler, AZ (US)

(72) Inventors: Bartlet H. Deprospo, Chandler, AZ (US); Jose F. Solis-Camara, Chandler, AZ (US); Mary Pickens, Chandler, AZ (US); Carlos Andres Riera Cercado, Chandler, AZ (US); Sepehr Soroushiani, Chandler, AZ (US); Ryan Wong, Chandler, AZ (US)

(73) Assignee: Saras Micro Devices, Inc., Chandler, AZ (US)

( * ) Notice: Subject to any disclaimer, the term of this patent is extended or adjusted under 35 U.S.C. 154(b) by 381 days.

(21) Appl. No.: 18/497,808

(22) Filed: Oct. 30, 2023

(65) Prior Publication Data

US 2025/0140483 A1 May 1, 2025

(51) Int. Cl.
*H01G 9/15* (2006.01)
*H01G 9/012* (2006.01)
*H01G 9/028* (2006.01)
*H01G 9/26* (2006.01)

(52) U.S. Cl.
CPC ............... *H01G 9/26* (2013.01); *H01G 9/012* (2013.01); *H01G 9/15* (2013.01); *H01G 9/028* (2013.01)

(58) Field of Classification Search
CPC .......... H01G 9/028; H01G 9/012; H01G 9/15; H01G 9/26
See application file for complete search history.

(56) References Cited

U.S. PATENT DOCUMENTS 7,821,795 B2 * 10/2010 Sugaya .................. H05K 1/186 361/523
2005/0013092 A1 1/2005 Yuan et al.
2009/0120014 A1 * 5/2009 Picarazzi ............ E04B 1/34363 52/169.6
2013/0070392 A1 3/2013 Merker et al.
2018/0151297 A1 5/2018 Hattori et al.
(Continued)

FOREIGN PATENT DOCUMENTS

JP 2007251101 A * 9/2007
JP 2008108841 A * 5/2008
(Continued)

*Primary Examiner* — David M Sinclair
(74) *Attorney, Agent, or Firm* — Stetina Garred Brucker & Newboles

(57) ABSTRACT

An integrated passive device (IPD) comprises a first and second stacked capacitors, each including a conductive substrate having a front side and a back side, a front dielectric layer on the front side of the conductive substrate, a back dielectric layer on the back side of the conductive substrate, a front conductive polymer layer on the front dielectric layer, and a back conductive polymer layer on the back dielectric layer. The IPD may comprise a first metal contact electrically connected to one or both of the conductive substrates of the first and second capacitors and a second metal contact electrically isolated from the first metal contact and electrically connected to the front and back conductive polymer layers of the first and second capacitors. The IPD may comprise a passthrough electrical connection between front and back outer surfaces of the IPD.

19 Claims, 15 Drawing Sheets

(56) References Cited

U.S. PATENT DOCUMENTS

| | | | | |
|---|---|---|---|---|
| 2023/0067888 | A1 | 3/2023 | Gopalaswamy et al. | |
| 2024/0128028 | A1 * | 4/2024 | Furukawa | H01G 9/028 |
| 2024/0242892 | A1 * | 7/2024 | Takahashi | H01G 9/14 |
| 2025/0037940 | A1 * | 1/2025 | Cai | H01G 9/012 |
| 2025/0079090 | A1 * | 3/2025 | Habu | H01G 9/028 |
| 2025/0087427 | A1 * | 3/2025 | Amamoto | H01G 4/38 |
| 2025/0125098 | A1 * | 4/2025 | Takahashi | H01G 9/012 |
| 2025/0149261 | A1 * | 5/2025 | Tokuda | H01G 9/055 |
| 2025/0166927 | A1 * | 5/2025 | Yoshikawa | H01G 9/012 |

FOREIGN PATENT DOCUMENTS

| | | | | |
|---|---|---|---|---|
| WO | WO-2024019144 | A1 * | 1/2024 | H01G 9/00 |
| WO | WO-2024257531 | A1 * | 12/2024 | H01G 9/048 |

* cited by examiner

INTEGRATED PASSIVE DEVICES WITH ENHANCED FORM FACTOR

CROSS-REFERENCE TO RELATED APPLICATIONS

Not Applicable

STATEMENT RE: FEDERALLY SPONSORED RESEARCH/DEVELOPMENT

Not Applicable

BACKGROUND

The present disclosure generally relates to integrated passive devices (IPDs) and, more particularly, to double-sided capacitors that exhibit high capacitance and low series resistance.

Capacitors are an important part of many integrated and embedded circuits and are commonly used as energy storage structures, filters, or as specific components of complex circuits. Capacitors generally make use of high surface area to achieve high capacitance values and are commonly arranged as a pair of thin electrodes separated by a dielectric and rolled into a tight cylindrical structure to optimize the surface area per unit volume. They are also made as deep trenches in silicon to benefit from more surface area, or as layers of dielectric and metal stacked and connected to each other to benefit from both permittivity and surface area.

Efforts to maximize capacitance and minimize equivalent series resistance (ESR) of capacitors have led to the development of double-sided capacitors such as those described in Applicant's own U.S. Patent Application Pub. No. 2023/0067888 ("the '888 publication"), entitled "Planar High-Density Aluminum Capacitors for Stacking and Embedding," and U.S. patent application Ser. No. 18/223,194 ("the '194 application"), filed Jul. 18, 2023 and entitled "Pre-Drilled Vias to capture Double Sided Capacitance," the entire contents of each of which is incorporated by reference herein. Such arrangements may define a second electrode (e.g., a cathode), such as a conductive polymer, metal, or ceramic, that is disposed on both sides of a first electrode (e.g., an anode) made of aluminum that has been etched or otherwise modified to have a high surface area, with an oxide layer formed therebetween to act as the dielectric. While such double-sided capacitors have the potential to double the usable surface area of the first electrode and, thus, double the capacitance relative to conventional devices, there are applications such as High Performance Computing (HPC) and other computing and mobile applications that demand yet higher capacitance within the same footprint.

To achieve higher capacitance, capacitive elements such as these double-sided capacitors may, in principle, be stacked on one another. However, any passthrough via connections that may have been provided within the individual capacitors are blocked and made non-functional due to the stacking. As a result, the footprint of the device must often be expanded to provide additional area for these passthrough connections as may be needed for a given application. In addition, simple stacking of individual capacitive elements does not accommodate larger architectures capable of isolating multiple differently sized (or equally sized) capacitors in each layer.

BRIEF SUMMARY

The present disclosure contemplates various devices and methods for overcoming the above drawbacks accompanying the related art. One aspect of the embodiments of the present disclosure is an integrated passive device comprising a first capacitor including a conductive substrate having a front side and a back side, a front dielectric layer on the front side of the conductive substrate, a back dielectric layer on the back side of the conductive substrate, a front conductive polymer layer on the front dielectric layer, and a back conductive polymer layer on the back dielectric layer, a second capacitor stacked on the first capacitor, the second capacitor including a conductive substrate having a front side and a back side, a front dielectric layer on the front side of the conductive substrate, a back dielectric layer on the back side of the conductive substrate, a front conductive polymer layer on the front dielectric layer, and a back conductive polymer layer on the back dielectric layer, a first metal contact electrically connected to one or both of the conductive substrates of the first and second capacitors, a second metal contact electrically isolated from the first metal contact and electrically connected to the front and back conductive polymer layers of the first and second capacitors, and a passthrough electrical connection between a front outer surface of the integrated passive device and a back outer surface of the integrated passive device opposite the front outer surface.

The first and second capacitors may be bonded together by a conductive foil. The first capacitor may include a front metallization layer arranged to promote electrical conductivity between the front conductive polymer layer of the first capacitor and the second metal contact. The first capacitor may include a back metallization layer arranged to promote electrical conductivity between the back conductive polymer layer of the first capacitor and the second metal contact. The second capacitor may include a front metallization layer arranged to promote electrical conductivity between the front conductive polymer layer of the second capacitor and the second metal contact. The second capacitor may include a back metallization layer arranged to promote electrical conductivity between the back conductive polymer layer of the second capacitor and the second metal contact. The conductive foil may be arranged to bond the front metallization layer of the first capacitor to the back metallization layer of the second capacitor. The first capacitor may include a front carbonaceous layer on the front conductive polymer layer and a back carbonaceous layer on the back conductive polymer layer. The second capacitor may include a front carbonaceous layer on the front conductive polymer layer and a back carbonaceous layer on the back conductive polymer layer. In each of the first and second capacitors, the front metallization layer may be on the front carbonaceous layer and the back metallization layer may be on the back carbonaceous layer. The first metal contact may be provided on the front outer surface of the integrated passive device and may be electrically connected to the conductive substrate of the first capacitor by a path including a through via. The passthrough connection may comprise the first metal contact and the through via. The second metal contact may be provided on the front outer surface of the integrated passive device and may be electrically connected to the back conductive polymer layer of the first capacitor by way of the conductive foil. The passthrough connection may comprise the second metal contact and the conductive foil.

The first and second capacitors may be bonded together by a metallization layer. For example, the integrated passive device may comprise a first metallization layer arranged to promote electrical conductivity between the front conductive polymer layer of the first capacitor and the second metal contact and to promote electrical conductivity between the back conductive polymer layer of the second capacitor and the second metal contact. The first and second capacitors may be bonded together by the first metallization layer. The first capacitor may include a front carbonaceous layer on the front conductive polymer layer. The second capacitor may include a back carbonaceous layer on the back conductive polymer layer. The first metallization layer may be on the front carbonaceous layer of the first capacitor and on the back carbonaceous layer of the second capacitor.

The integrated passive device may comprise a third capacitor stacked underneath the first capacitor, the third capacitor including a conductive substrate having a front side and a back side, a front dielectric layer on the front side of the conductive substrate, a back dielectric layer on the back side of the conductive substrate, a front conductive polymer layer on the front dielectric layer, and a back conductive polymer layer on the back dielectric layer. The first metal contact may be electrically connected to the conductive substrates of the first, second, and third capacitors. The second metal contact may be electrically connected to the front and back conductive polymer layers of the first, second, and third capacitors. The integrated passive device may comprise a second metallization layer arranged to promote electrical conductivity between the back conductive polymer layer of the first capacitor and the second metal contact and to promote electrical conductivity between the front conductive polymer layer of the third capacitor and the second metal contact. The first and third capacitors may be bonded together by the second metallization layer. The first capacitor may include a front carbonaceous layer on the front conductive polymer layer and a back carbonaceous layer on the back conductive polymer layer. The second capacitor may include a back carbonaceous layer on the back conductive polymer layer. The third capacitor may include a front carbonaceous layer on the front conductive polymer layer. The first metallization layer may be on the front carbonaceous layer of the first capacitor and on the back carbonaceous layer of the second capacitor. The second metallization layer may be on the back carbonaceous layer of the first capacitor and on the front carbonaceous layer of the third capacitor. Each of the first and second capacitors may include a sidewall dielectric layer on a sidewall of the conductive substrate, the sidewall dielectric layer connecting the front and back dielectric layers. The integrated passive device may comprise a termination pad that extends along the sidewall dielectric layers of the first and second capacitors, the second metal contact being electrically connected to the first metallization layer by way of the termination pad.

The first and second capacitors may be bonded together by a conductive paste applied between metallization layers. For example, the first capacitor may include a front metallization layer arranged to promote electrical conductivity between the front conductive polymer layer of the first capacitor and the second metal contact. The first capacitor may include a back metallization layer arranged to promote electrical conductivity between the back conductive polymer layer of the first capacitor and the second metal contact. The second capacitor may include a front metallization layer arranged to promote electrical conductivity between the front conductive polymer layer of the second capacitor and the second metal contact. The second capacitor may include a back metallization layer arranged to promote electrical conductivity between the back conductive polymer layer of the second capacitor and the second metal contact. The front metallization layer of the first capacitor may be bonded to the back metallization layer of the second capacitor by a conductive paste.

As another example, the first capacitor may include a front metallization layer arranged to promote electrical conductivity between the front conductive polymer layer of the first capacitor and the second metal contact. The first capacitor may include a back metallization layer arranged to promote electrical conductivity between the back conductive polymer layer of the first capacitor and the second metal contact. The second capacitor may include a front metallization layer arranged to promote electrical conductivity between the front conductive polymer layer of the second capacitor and the second metal contact. The second capacitor may include a back metallization layer arranged to promote electrical conductivity between the back conductive polymer layer of the second capacitor and the second metal contact. The front metallization layer of the first capacitor and the back metallization layer of the second capacitor may be bonded to opposing sides of a metal contact layer by a conductive paste.

The first and second capacitors may be bonded together by solder. For example, the first capacitor may include a front metallization layer arranged to promote electrical conductivity between the front conductive polymer layer of the first capacitor and the second metal contact. The first capacitor may include a back metallization layer arranged to promote electrical conductivity between the back conductive polymer layer of the first capacitor and the second metal contact. The second capacitor may include a front metallization layer arranged to promote electrical conductivity between the front conductive polymer layer of the second capacitor and the second metal contact. The second capacitor may include a back metallization layer arranged to promote electrical conductivity between the back conductive polymer layer of the second capacitor and the second metal contact. The front metallization layer of the first capacitor may be bonded to a first metal contact layer by a conductive paste. The back metallization layer of the second capacitor may be bonded to a second metal contact layer by a conductive paste. The first and second metal contact layers may be bonded together by solder.

Another aspect of the embodiments of the present disclosure is a method of manufacturing an integrated passive device. The method may comprise providing a first capacitor including a conductive substrate having a front side and a back side, a front dielectric layer on the front side of the conductive substrate, a back dielectric layer on the back side of the conductive substrate, a front conductive polymer layer on the front dielectric layer, and a back conductive polymer layer on the back dielectric layer, stacking a second capacitor on the first capacitor, the second capacitor including a conductive substrate having a front side and a back side, a front dielectric layer on the front side of the conductive substrate, a back dielectric layer on the back side of the conductive substrate, a front conductive polymer layer on the front dielectric layer, and a back conductive polymer layer on the back dielectric layer, and, after said stacking, forming a first metal contact electrically connected to one or both of the conductive substrates of the first and second capacitors, forming a second metal contact electrically isolated from the first metal contact and electrically connected to the front and back conductive polymer layers of the first and second capacitors, and forming a passthrough electrical connection between a front outer surface of the integrated passive device and a back outer surface of the integrated passive device opposite the front outer surface.

The stacking of the second capacitor on the first capacitor may comprise bonding the first and second capacitors together by a conductive foil provided therebetween. The stacking of the second capacitor on the first capacitor may comprise bonding the first and second capacitors together by a metallization layer arranged to promote electrical conductivity between the front conductive polymer layer of the first capacitor and the second metal contact and to promote electrical conductivity between the back conductive polymer layer of the second capacitor and the second metal contact.

Another aspect of the embodiments of the present disclosure is a method of manufacturing an integrated passive device. The method may comprise providing a first capacitor including a conductive substrate having a front side and a back side, a front dielectric layer on the front side of the conductive substrate, a back dielectric layer on the back side of the conductive substrate, a front conductive polymer layer on the front dielectric layer, and a back conductive polymer layer on the back dielectric layer, establishing electrical connections from outside the first capacitor to the conductive substrate of the first capacitor and to the front and back conductive polymer layers of the first capacitor, and, after said establishing the electrical connections, stacking a second capacitor on the first capacitor to provide a passthrough electrical connection between a front outer surface of the integrated passive device and a back outer surface of the integrated passive device opposite the front outer surface. The second capacitor may include a conductive substrate having a front side and a back side, a front dielectric layer on the front side of the conductive substrate, a back dielectric layer on the back side of the conductive substrate, a front conductive polymer layer on the front dielectric layer, and a back conductive polymer layer on the back dielectric layer.

The stacking of the second capacitor on the first capacitor may comprise bonding the first and second capacitors together using a conductive paste or solder.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The present disclosure encompasses various embodiments of capacitors and methods of manufacturing the same. The detailed description set forth below in connection with the appended drawings is intended as a description of several currently contemplated embodiments and is not intended to represent the only form in which the disclosed subject matter may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
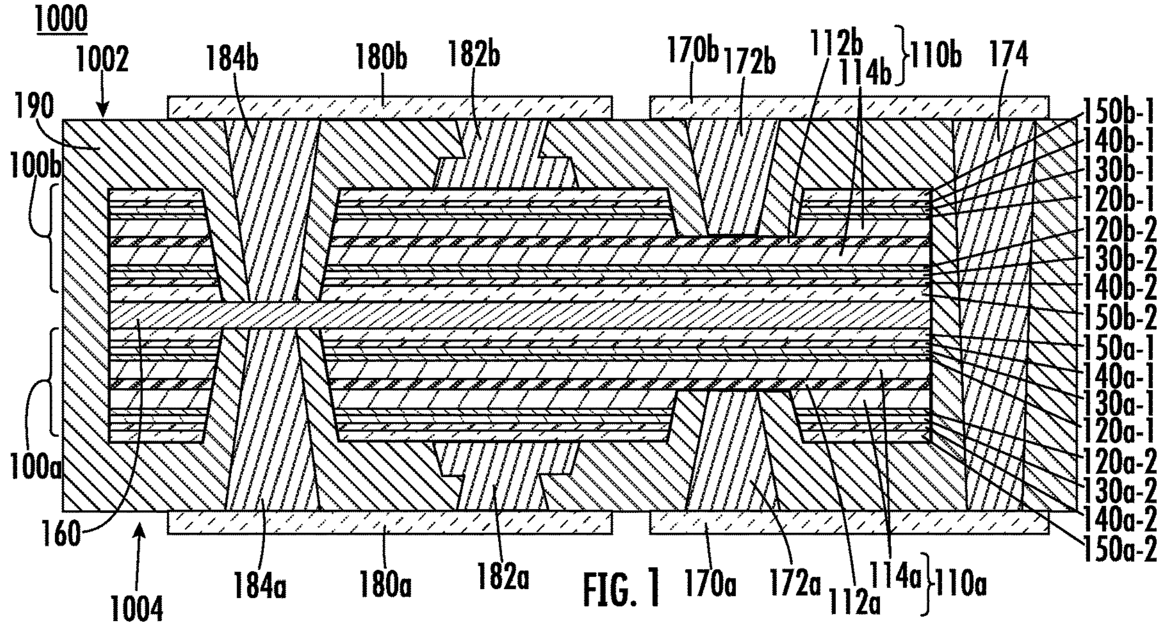
FIG. 1 is a cross-sectional view of an integrated passive device (IPD) according to an embodiment of the present disclosure.

FIG. 1 is a cross-sectional view of an integrated passive device (IPD) 1000 according to an embodiment of the present disclosure. The IPD 1000 may comprise a first capacitor 100*a* and a second capacitor 100*b* stacked on the first capacitor 100*a*. The first capacitor 100*a* may comprise a conductive substrate 110*a* serving as a first electrode (e.g., an anode), a dielectric layer 120*a*-1, 120*a*-2, and a conductive polymer layer 130*a*-1, 130*a*-2 serving as a second electrode (e.g., a cathode). In order to achieve effectively twice the surface area and thus twice the capacitance of a single-sided device, the first capacitor 100*a* may be double-sided in the sense that the dielectric layer 120*a*-1, 120*a*-2 may include a front dielectric layer 120*a*-1 provided on a front side of the conductive substrate 110*a* as well as a back dielectric layer 120*a*-2 provided on a back side of the conductive substrate 110*a*, with the conductive polymer layer 130*a*-1, 130*a*-2 including a front conductive polymer layer 130*a*-1 on the front dielectric layer 120*a*-1 and a back conductive polymer layer 130*a*-2 on the back dielectric layer 120*a*-2. The second capacitor 100*b* may have the same structure as the first capacitor 100*a* and, in particular, may similarly be double-sided and may comprise a conductive substrate 110*b*, front and back dielectric layers 120*b*-1, 120*b*-2 on respective front and back sides of the conductive substrate 100*b*, and front and back conductive polymer layers 130*b*-1, 130*b*-2 on the front and back dielectric layers 120*b*-1, 120*b*-2. Stacking of the first and second capacitors 100*a*, 100*b* may be achieved in a variety of ways as described herein. As shown in FIG. 1, for example, the first and second capacitors 100*a*, 100*b* may be bonded together by a conductive foil 160 such as a copper foil.

The IPD 1000 may be incorporated into energy storage structures, filters, or other circuit components by way of a first metal contact 170*b* that is electrically connected to one or both of the conductive substrates 110*a*, 110*b* of the first and second capacitors 100*a*, 100*b* and a second metal contact 180*b* that is electrically isolated from the first metal contact 170*b* and electrically connected to the front and back conductive polymer layers 130*a*-1, 130*a*-2, 130*b*-1, 130*b*-2 of the first and/or second capacitors 100*a*, 100*b*. The first and second metal contacts 170*b*, 180*b* may be provided on a front outer surface 1002 of the IPD 1000, allowing for connection of the IPD 1000 to external circuits from a single side in some cases. As shown in FIG. 1, however, the IPD 1000 may additionally have third and/or fourth metal contacts 170*a*, 180*a* provided on a back outer surface 1004 of the IPD 1000 opposite the first outer surface 1002. The third metal contact may similarly be electrically connected to one or both of the conductive substrates 110*a*, 110*b* of the first and second capacitors 100*a*, 100*b*, and the fourth metal contact 180*a* may be electrically isolated from the third metal contact 170*a* and electrically connected to the front and back conductive polymer layers 130*a*-1, 130*a*-2, 130*b*-1, 130*b*-2 of the first and/or second capacitors 100*a*, 100*b*.

As illustrated by way of example, connections between the metal contacts 170*a*, 180*a*, 170*b*, 180*b* and the various internal structures of the IPD 1000 may be formed using conductive via fill 172*b* (electrically connecting the first metal contact 170*b* with the conductive substrate 110*b* of the second capacitor 100*b*), conductive via fill 182*b* (electrically connecting the second metal contact 180*b* with the front conductive polymer layer 130*b*-1 of the second capacitor 100*b*), conductive via fill 184*b* (electrically connecting the second metal contact 180*b* with the conductive foil 160), conductive via fill 172*a* (electrically connecting the third metal contact 170*a* with the conductive substrate 110*a* of the first capacitor 100*a*), conductive via fill 182*a* (electrically connecting the fourth metal contact 180*a* with the back conductive polymer layer 130*a*-2 of the first capacitor 100*a*), and conductive via fill 184*a* (electrically connecting the fourth metal contact 180*b* with the conductive foil 160). Conductive via fill 174 may additionally be provided connecting the first and third metal contacts 170*a*, 170*b* to each other and providing an electrical connection between the first (front) metal contact 170*b* and the conductive substrate 110*a* of the first capacitor 100*a* by way of the third metal contact 170*a* and conductive via fill 172*a*. Along the same lines, it may be appreciated that the second (front) metal contact 180*b* may be electrically connected to the back conductive polymer layer 130*b*-2 of the second capacitor 100*b* and to the front conductive polymer layer 130*a*-1 of the first capacitor 100*a* by way of the conductive via fill 184*b* and the conductive foil 160, as well as to the back conductive polymer layer 130*a*-2 of the first capacitor 100*a* further by way of the conductive via fill 184*a*, the fourth metal contact 180*a*, and the conductive via fill 182*a*. In this way, the conductive foil 160 may not only bond the first and second capacitors 100*a*, 100*b* together but may provide electrical connection therebetween.

Advantageously, the IPD 1000 may comprise a passthrough electrical connection between the front and back outer surfaces 1002, 1004 of the IPD 1000. As described above and shown in FIG. 1, the first metal contact 172*b*, which may be provided on the front outer surface 1002 of the IPD 1000, may be electrically connected to the conductive substrate 110*a* of the first capacitor 100*a* by a path including a through via filled by the conductive via fill 174. As such, the passthrough electrical connection between the front and back outer surfaces 1002, 1004 of the IPD 1000 may comprise the first metal contact 172*b* and the same through via (filled by the conductive via fill 174 in FIG. 1). In this case, the passthrough electrical connection may be electrically connected to the first electrode (e.g., an anode) and may terminate at the first and third metal contacts 170*b*, 170*a*. Another example of the passthrough electrical connection between the front and back outer surfaces 1002, 1004 of the IPD 1000 may comprise the second metal contact 180*b* and the conductive foil 160, for example, by way of the conductive via fill 184*b* and the conductive via fill 184*a*. In this case, the passthrough electrical connection may be electrically connected to the second electrode (e.g., a cathode) and may terminate at the second and fourth metal contacts 180*b*, 180*a*. Additionally, or alternatively, a passthrough electrical connection may be neither electrically connected to the first electrode nor to the second electrode and may, for example, comprise a through via that terminates in dedicated metal contacts that are electrically isolated from the metal contacts 170*a*, 170*b*, 180*a*, 180*b* shown in FIG. 1.

Owing to the passthrough electrical connection, it is possible to employ the capacitors 100*a*, 100*b* of the IPD 1000 in a variety of contexts for different purposes including, for example, filtering, decoupling, and/or bypass capacitor functions without needing to introduce additional passthrough connections that would take up extra space.

Moreover, as the passthrough connection is already built in to the IPD 1000, the precise layout of the capacitors 100*a*, 100*b* on each layer of the stack need not be considered as would be needed when creating passthrough connections after-the-fact, allowing for design flexibility in producing the IPD 1000 and making it possible for multiple distinct capacitors to be built on the same IPD 1000, including differently sized capacitors as well as equally sized capacitors as desired. By maintaining the passthrough electrical connection, the disclosed IPD 1000 and other IPDs described herein may achieve the desired flexibility while advantageously allowing for the stacking of two or more capacitors for increased capacitance (theoretically double for two stacked capacitors) and reduced series resistance (theoretically half for two stacked capacitors) within the same device footprint. The resulting devices may be electrically tested before and after stacking, for example.

As noted above and shown in FIG. 1, the first and second capacitors 100*a*, 100*b* may be bonded together by a conductive foil 160 such as a copper foil. In particular, as detailed in FIGS. 2-5, the bonding of the first and second capacitors 100*a*, 100*b* using the conductive foil 160 may be done at the core level, i.e., prior to integration. The process may begin with providing the first capacitor 100*a*, which may be produced by first providing the conductive substrate 110*a* (see also FIG. 1), which may be made of aluminum, an aluminum alloy, or another material that is etched or otherwise modified to have a high surface area, such as an etched aluminum foil as described in the '888 publication. Alternative or additional modifications to increase the surface area of the conductive substrate 110*a* may include deposition of a sintered aluminum powder or other aluminum, aluminum oxide, titanium, or titanium oxide powder thereon. The conductive substrate 110*a* may be a metal foil as described in Applicant's own U.S. Patent Application Pub. No. 2023/0073898, entitled "Modified Metal Foil Capacitors and Methods for Making Same," the entire contents of which is incorporated by reference herein. As illustrated, the conductive substrate 110*a* may thus comprise a solid metal portion 112*a* and a high surface area portion 114*a* on front and back sides thereof.

A dielectric layer 120*a*-1, 120*a*-2 (separately referenced as front and back layers) such as a naturally occurring oxide layer (e.g., an aluminum oxide layer), or one that has been grown by an anodization process (e.g., by placing the conductive substrate 110*a* in an electrolytic solution and passing a current through the solution), grown by thermal oxidation in a humidity chamber, or coated on the conductive substrate 110*a* (e.g., by atomic layer deposition), may be formed on both sides of the conductive substrate 110*a*. As may be appreciated, the dielectric layer 120*a*-1, 120*a*-2 may, in general, exhibit the same high surface area as the underlying conductive substrate 110*a* as it fills in and takes the shape of the various tunnels and recesses that may result from the etching or other modification to the material of the conductive substrate 110*a*. Higher dielectric constant materials are also contemplated in order to improve capacitance for the same surface area, such as $HfO_2$, $ZrO_2$, BaO, and $TiO_2$. Preferably, the dielectric constant K of the material may be greater than 20, more preferably greater than 25. These materials may sbe deposited instead of or in addition to aluminum oxide ($Al_2O_3$), for example, by conformal deposition such as selective atomic layer deposition (ALD). The higher relative permittivity as defined by the dielectric constant of the material, in combination with the high surface area as described above, may achieve a proportionally higher capacitance according to the equation Capacitance=(K*A)/T, where K is the dielectric constant, A is the area, and T is the thickness. In the case of using multiple materials, the capacitance may be determined according to the equation Capacitance=(K1*K2/(K1*T2+K2*T1))s*A, where K1 and K2 are the respective dielectric constants of the two materials and T1 and T2 are the respective thicknesses of the two materials.

A conductive polymer layer 130*a*-1, 130*a*-2 may then be provided on the front and back dielectric layers 120*a*-1, 120*a*-2, in some cases following a process of pre-drilling one or more vias as described in the '194 application. In this way, the second electrode (e.g., cathode) defined by the conductive polymer layer 130*a*-1, 130*a*-2 may beneficially extend over both sides of the first electrode (e.g., anode) defined by the conductive substrate 110*a* with the dielectric layer 120*a*-1, 120*a*-2 therebetween, effectively taking advantage of both sides of the conductive substrate 110*a* to double the surface area and thus the capacitance. It is noted that, like the dielectric layer 120*a*-1, 120*a*-2, the conductive polymer layer 130*a*-1, 130*a*-2 may exhibit the same high surface area as the underlying conductive substrate 110*a* as it fills in and takes the shape of the various tunnels and recesses that may result from the etching or other modification to the material of the conductive substrate 110*a*, in this case with the dielectric layer 120*a*-1, 120*a*-2 sandwiched therebetween. A variety of conductive polymers may be suitable for use as the second electrode of the capacitor 100*a* described herein. The conductive polymer layer 130*a*-1, 130*a*-2 may, for example, comprise one or more of a polypyrrole, a polythiophene, a polyaniline, a polyacetylene, a polyphenylene, a poly(p-phenylene-vinylene), PEDOT:PSS (poly(3,4-ethylenedioxythiophene) polystyrene sulfonate), or P3HT (poly(3-hexylthiophene-2,5-diyl)). In some cases, TiN or Pt may be used in place of the conductive polymer. Some example combinations of one or more dielectric layers and a conductive polymer (or other conductive material) layer that may be stacked on an aluminum substrate include i) $Al_2O_3$ and then PEDOT:PSS, ii) a high K dielectric as described above and then PEDOT:PSS, iii) $Al_2O_3$ and then a high K dielectric and then PEDOT:PSS, iv) a high K dielectric and then TiN or Pt, v) $Al_2O_3$ and then a high K dielectric and then TiN or Pt, and vi) TiN or Pt and then a high K dielectric, and then another layer of TiN or Pt.

Figure 2:
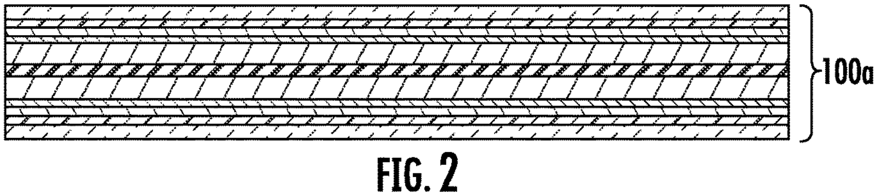
FIG. 2 is a cross-sectional view of a processing stage in manufacturing the IPD of FIG. 1.

As shown in FIG. 2, additional layers may be built up on the conductive polymer layer 130*a*-1, 130*a*-2 in order to improve the electrical connection between the polymer layer 130*a*-1, 130*a*-2 and the second metal contact(s) 180*a*, 180*b*. For example, a carbonaceous layer 140*a*-1, 140*a*-2 (individually referenced as front and back layers) and/or a metallization layer 150*a*-1, 150*a*-2 (individually referenced as front and back layers) may be applied on the conductive polymer layer 130*a*-1, 130*a*-2 (see also FIG. 1). The front and back carbonaceous layers 140*a*-1, 140*a*-2 may be applied in direct, physical contact with the front and back conductive polymer layers 130*a*-1, 130*a*-2, respectively, and the front and back metallization layers 150*a*-1, 150*a*-2 may be applied on the conductive polymer layer 130*a*-1, 130*a*-2 by being in direct, physical contact with the respective carbonaceous layers 140*a*-1, 140*a*-2 thereon. Preferably, the application of the metallization layer 150*a*-1, 150*a*-2 may comprise depositing a diffusion barrier on the conductive polymer layer (e.g., directly in contact with the carbonaceous layer 140*a*-1, 140*a*-2 thereon) and depositing metal adjacent the diffusion barrier. The carbonaceous layer 140*a*-1, 140*a*-2, if included, may advantageously reduce a contact resistance between the conductive polymer layer 130*a*-1, 130*a*-2 and other components, such as a diffusion barrier layer of the metallization layer 150*a*-1, 150*a*-2. The carbonaceous layer 140*a*-1, 140*a*-2 may include, for example, carbon black, graphite, a carbon-based ink, or a polymeric, and may be applied using a variety of techniques, such as screen printing, inkjet printing, sputter deposition, vacuum deposition, spin coating, doctor blading, or the like. The metallization layer 150*a*-1, 150*a*-2 may be used to provide high-quality electrical conductivity between the respective conductive polymer layer 130*a*-1, 130*a*-2 (acting as the second electrode of the capacitor 100*a*) and the second metal contact(s) 180*a*, 180*b* for electrical connection of the capacitor 100*a* with an external circuit. The metallization layer 150*a*-1, 150*a*-2 may include a metal such as Ag, Au, Cu, Pt, Pd, and/or composites or alloys of the aforementioned metals, or in some cases polymers such as epoxies, silicones, or fluoroelastomers. Including a diffusion barrier layer in the metallization layer 150*a*-1, 150*a*-2 may limit infiltration of components from the metallization layer 150*a*-1, 150*a*-2 into the carbonaceous layer 140*a*-1, 140*a*-2 or conductive polymer layer 130*a*-1, 130*a*-2. Example materials for a diffusion barrier layer include, but are not limited to, Ti, W, Cr, Ti—W, TaN, and/or Co—W. The metallization layer 150*a*-1, 150*a*-2, as well as any diffusion barrier layer thereof, may be applied using any suitable techniques, such as vacuum deposition (e.g., sputter deposition).

Figure 3:
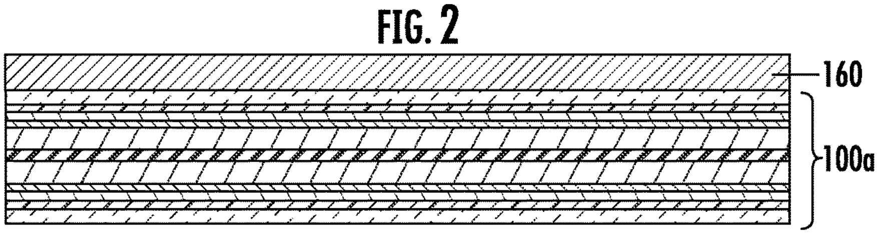
FIG. 3 is a cross-sectional view of another processing stage in manufacturing the IPD of FIG. 1.
Figure 4:
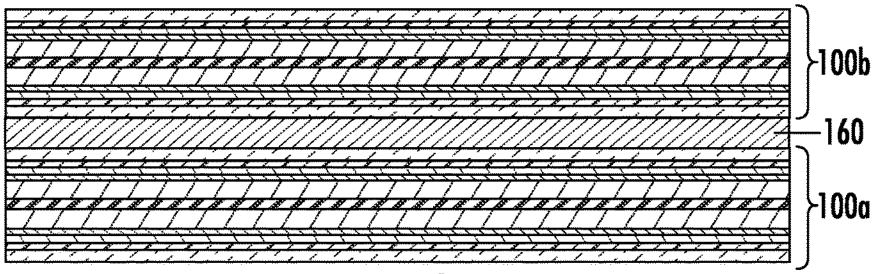
FIG. 4 is a cross-sectional view of another processing stage in manufacturing the IPD of FIG. 1.
Figure 5:
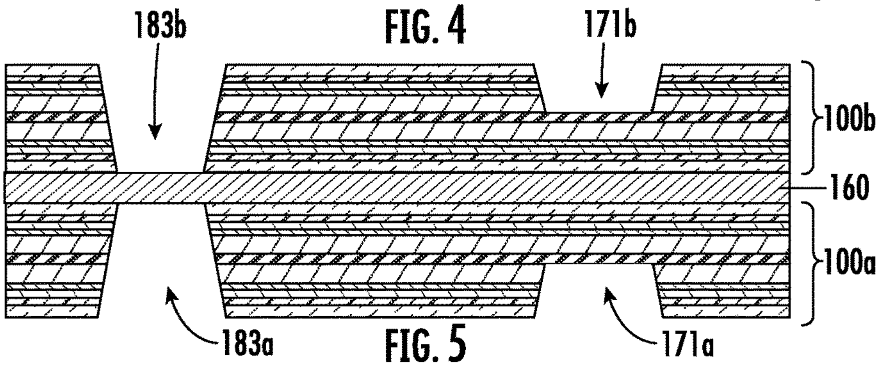
FIG. 5 is a cross-sectional view of another processing stage in manufacturing the IPD of FIG. 1.

After the stack buildup of the first capacitor 100*a* shown in FIG. 2, the conductive foil 160 (e.g., a copper foil or in some cases a paste, plate, etc.) may be placed on one side of the completed first capacitor 100*a* as shown in FIG. 3. The conductive foil 160 may be placed on the front metallization layer 150*a*-1 as shown, for example, and may typically be thicker than the front metallization layer 150*a*-1. As shown in FIG. 4, the second capacitor 100*b* (which may be built up in the same way as the first capacitor 100*a* and may have the same layers given the same reference numbers except with a "b" instead of an "a") may then be bonded (e.g., by metal sintering) to the first capacitor 100*a* with the conductive foil 160 therebetween. For example, the conductive foil 160 may bond the front metallization layer 150*a*-1 of the first capacitor 100*a* to the back metallization layer 150*b*-2 of the second capacitor 100*b*. The same processing steps may be repeated to bond more than two capacitors together in some cases. Lastly, as shown in FIG. 5, the integration stage may begin with laser processing to form electrical connections between the outermost capacitors (capacitors 100*a* and 100*b* in this example) and the front and back outer surfaces 1002, 1004 of the IPD 1000. In this regard, vias 171*a*, 171*b* (e.g., blind vias) may be formed to reveal respective portions of the conductive substrates 110*a*, 110*b* (e.g., solid metal portions 112*a*, 112*b* thereof, with laser processing stopping at a 25 μm pure aluminum layer, for example). Similarly, vias 183*a*, 183*b* (e.g., blind vias) may be formed to reveal front and back sides of the conductive foil 160. After applying an insulating material 190 (see FIG. 1), which may be a thermosetting film such as an Ajinomoto Build-up Film (ABF), to surround the capacitors 100*a*, 100*b*, the vias 171*a*, 171*b*, 183*a*, 183*b* may be redrilled within the insulating material 190 to be filled with conductive via fill 172*a*, 172*b*, 184*a*, 184*b* as shown in FIG. 1. Additional vias may also be newly drilled at this stage, such as to the outermost metallization layers 150*a*-2, 150*b*-1 (to be filled with via fill 182*a*, 182*b* as shown in FIG. 1) and/or through the entire device (to be filled with via fill 174 as shown in FIG. 1). The metal contacts 170*a*, 170*b*, 180*a*, 180*b* may then be formed on the outermost surfaces 1002, 1004 of the IPD 1000, electrically connecting the electrodes of the capacitors 100*a*, 100*b* to the outermost surfaces 1002, 1004 and advantageously providing the passthrough electrical connection(s) as described above.

Figure 6:
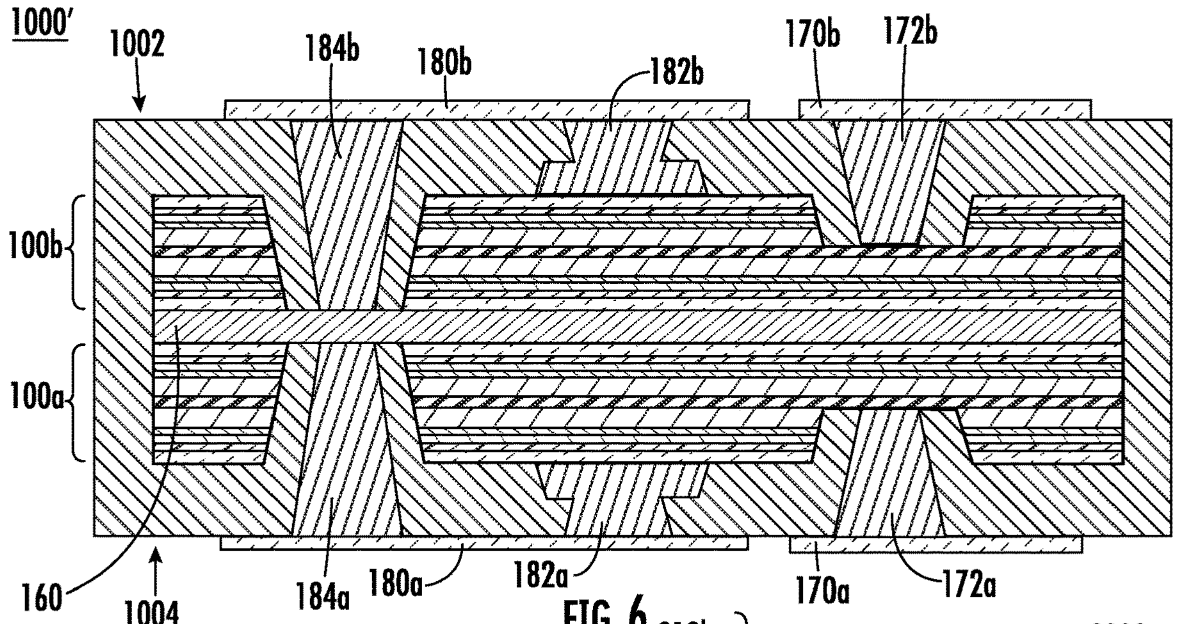
FIG. 6 is a cross-sectional view of another IPD according to an embodiment of the present disclosure.

FIG. 6 is a cross-sectional view of IPD 1000' according to an embodiment of the present disclosure. The IPD 1000' may be the same as the IPD 1000 and may be made by the same processing steps described above in relation to FIGS. 2-5, with the only difference being the omission of the passthrough electrical connection between the metal terminals 170*a* and 170*b*, namely, the via fill 174 shown in FIG. 1. As such, no through via need be formed and the deepest laser processing may stop on the conductive foil 160 or other adhesion or bonding layer and the overall footprint of the IPD 1000' may be smaller than that of the IPD 1000. The IPD 1000' may still advantageously include the passthrough electrical connection from the second metal contact 180*b*, through the conductive via fill 184*b*, the conductive foil 160, and the conductive via fill 184*a*, to the fourth metal contact 180*a*. It is contemplated that the passthrough electrical connection may be extended through three or more layers to further scale the IPD 1000 without needing to perfectly align each capacitor with the previous capacitor, as the large continuous second electrode (e.g., cathode) layer may be maintained even as the via fill 184*a*, 184*b*, etc. may be staggered and non-aligned vertically (though electrically connected by way of the intervening conductive foils 160).

Figure 7:
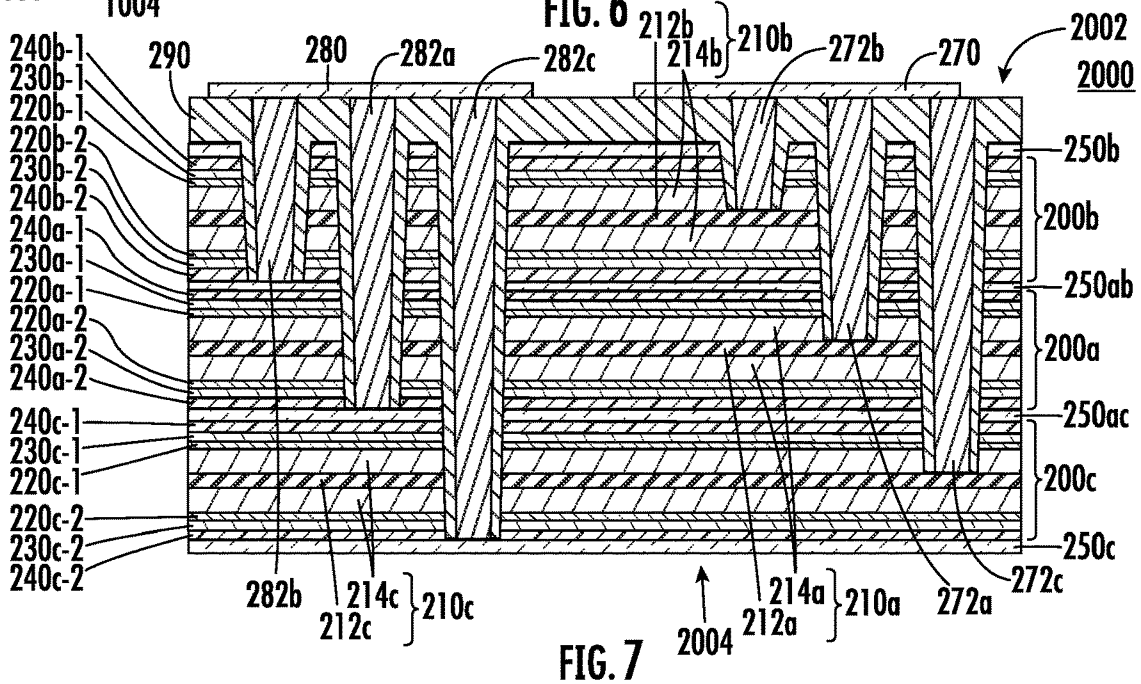
FIG. 7 is a cross-sectional view of another IPD according to an embodiment of the present disclosure.

FIG. 7 is a cross-sectional view of another IPD 2000 according to an embodiment of the present disclosure. Except as described herein, the IPD 2000 may be the same as the IPD 1000 and may include a first capacitor 200*a* and a second capacitor 200*b* stacked thereon that are the same as the first and second capacitors 100*a*, 100*b* (along with a third capacitor 200*c* that may be stacked underneath the first capacitor 100*a* and may be the same as optional additional capacitors mentioned in relation to FIG. 1). In this regard, it is noted that the capacitors 200*a*, 200*b*, 200*c* may comprise respective conductive substrates 210*a*, 210*b*, 210*c* (comprising solid metal portions 212*a*, 212*b*, 212*c* and high surface area portions 214*a*, 214*b*, 214*c*), along with respective front and back dielectric layers 220*a*-1, 220*a*-2, 220*b*-1, 220*b*-2, 220*c*-1, 220*c*-2, front and back conductive polymer layers 230*a*-1, 230*a*-2, 230*b*-1, 230*b*-2, 230*c*-1, 230*c*-2, and front and back carbonaceous layers 240*a*-1, 240*a*-2, 240*b*-1, 240*b*-2, 240*c*-1, 240*c*-2 that are the same as the substrates 110*a*, 110*b*, dielectric layers 120*a*-1, 120*a*-2, 120*b*-1, 120*b*-2, conductive polymer layers 130*a*-1, 130*a*-2, 130*b*-1, 130*b*-2, and carbonaceous layers 140*a*-1, 140*a*-2, 140*b*-1, 140*b*-2 described in relation to FIGS. 1-6. Like the capacitors 100*a*, 100*b* of the IPD 1000 (and IPD 1000'), the capacitors 200*a*, 200*b*, 200*c* of the IPD 2000 may be bonded together prior to integration. However, whereas the first and second capacitors 100*a*, 100*b* of the IPD 1000 (and IPD 1000') are bonded together by the conductive foil 160 as described above, the capacitors 200*a*, 200*b*, 200*c* of the IPD 2000 are bonded together by the intervening metallization layers 250*ab*, 250*ac*. As such, the core buildup of each capacitor 200*a*, 200*b*, 200*c* may exclude the addition of metallization layers in some cases, with adjacent capacitors 200*a*, 200*b* sharing metallization layer 250*ab* and adjacent capacitors 200*a*, 200*c* sharing metallization layer 250*ac*.

The IPD 2000 may be incorporated into energy storage structures, filters, or other circuit components by way of a first metal contact 270 that is electrically connected to the conductive substrates 210*a*, 210*b*, 210*c* of the first, second, and/or third capacitors 200*a*, 200*b*, 200*c* and a second metal contact 280 that is electrically isolated from the first metal contact 270 and electrically connected to the front and back conductive polymer layers 230a-1, 230a-2, 230b-1, 230b-2, 230c-1, 230c-2 of the first, second, and/or third capacitors 100a, 100b, 100c. The first and second metal contacts 270, 280 may be provided on a front outer surface 2002 of the IPD 2000, allowing for connection of the IPD 2000 to external circuits from a single side in some cases. Connections between the metal contacts 270, 280 and the various internal structures of the IPD 2000 may be formed using conductive via fill 272a, 272b, 272c (electrically connecting the first metal contact 270 with the conductive substrates 210a, 210b, 210c) and conductive via fill 282a, 282b, 282c (electrically connecting the second metal contact 280 with the front and back conductive polymer layers 230a-1, 230a-2, 230b-1, 230b-2, 230c-1, 230c-2 by way of the intervening metallization 250ab, 250ac and the back metallization layer 250c of the IPD 2000). Advantageously, the IPD 2000 may comprise a passthrough electrical connection between the front and back outer surfaces 2002, 2004 of the IPD 2000 by way of the conductive via fill 282c, which may extend all the way from the second metal contact 280 on the front outer surface 2002 of the IPD 2000 to the metallization layer 250c on the back outer surface 2004 of the IPD 2000.

Figure 8:
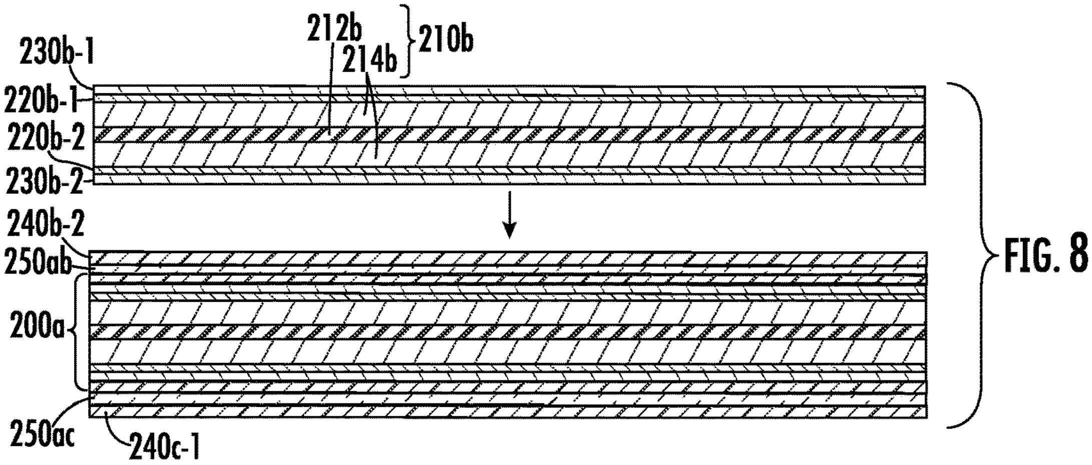
FIG. 8 is a cross-sectional view of a processing stage in manufacturing the IPD of FIG. 7.
Figure 9:
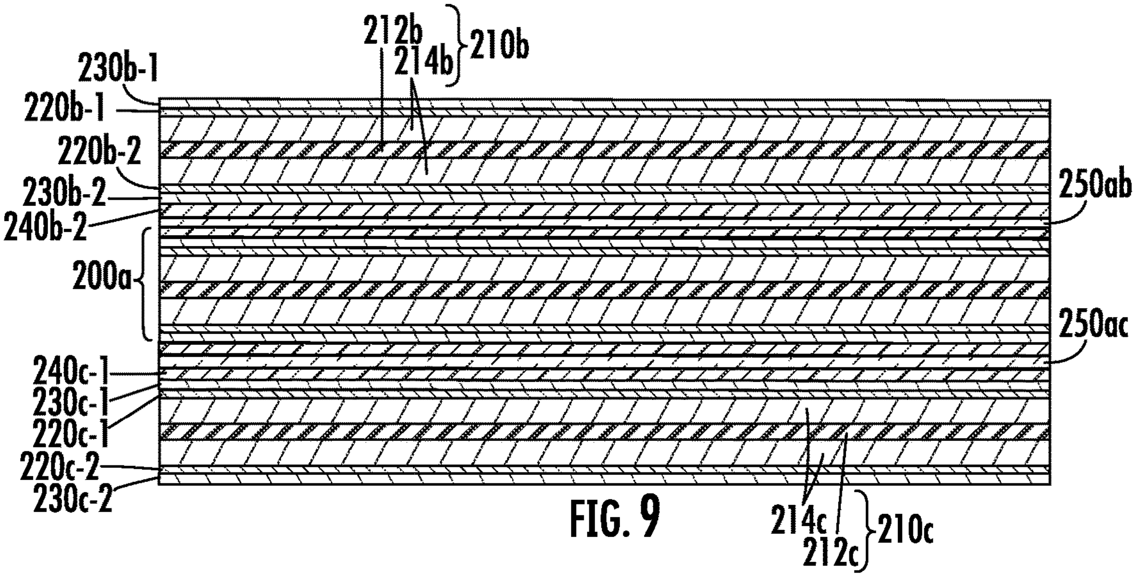
FIG. 9 is a cross-sectional view of another processing stage in manufacturing the IPD of FIG. 7.
Figure 10:
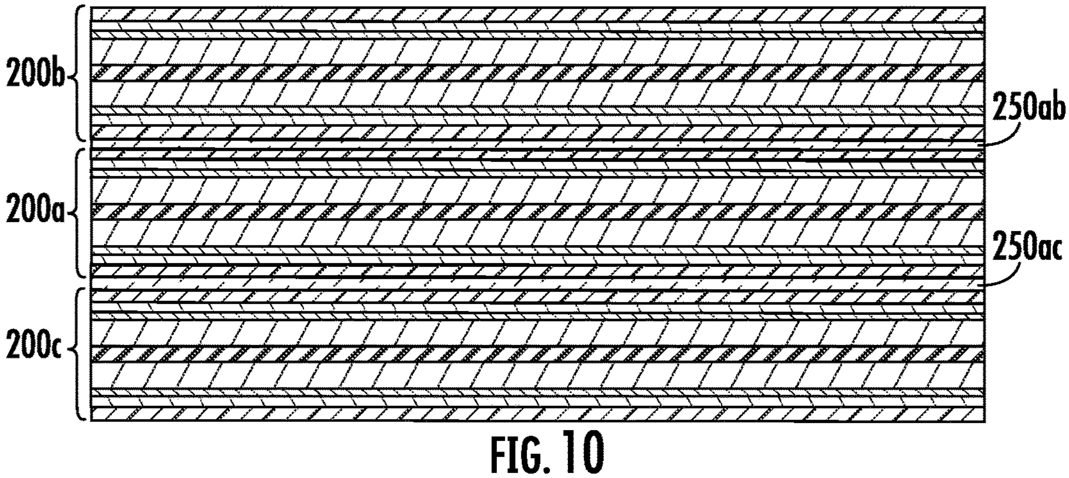
FIG. 10 is a cross-sectional view of another processing stage in manufacturing the IPD of FIG. 7.
Figure 11:
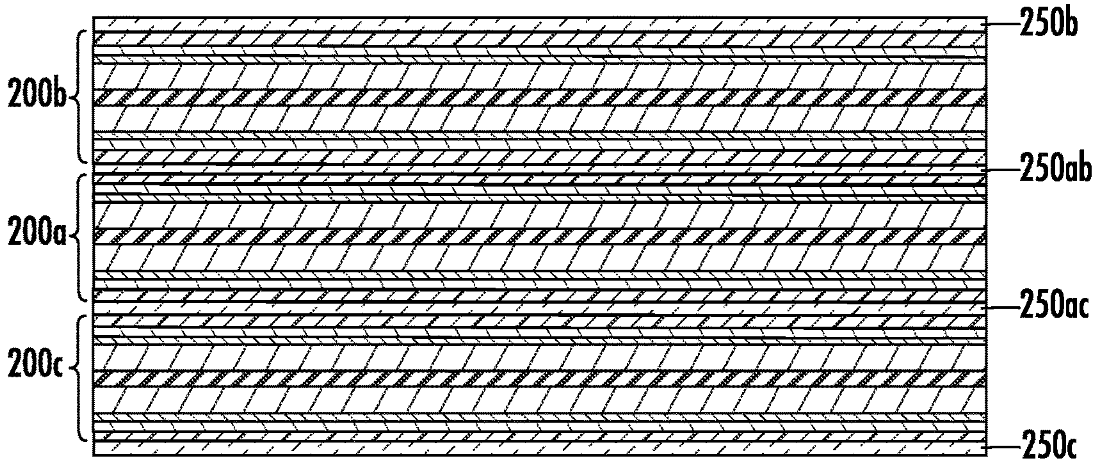
FIG. 11 is a cross-sectional view of another processing stage in manufacturing the IPD of FIG. 7.

Example processing stages for manufacturing the IPD 2000 are illustrated in FIGS. 8-12. First, as shown in FIG. 8, the process may begin with providing the first capacitor 200a (which will be the middle layer capacitor of the IPD 2000 in the example of FIG. 7). Given that metallization layers 250ab and 250ac will be shared by more than one capacitor in the completed IPD 2000 (see FIG. 7), for ease of reference the capacitors 200a, 200b, 200c may be defined without metallization layers. Defined in this way (merely for simplicity), the completed capacitors 200a, 200b, 200c may be considered identical in structure as shown in FIG. 7. Thus, referring to the lower part of FIG. 8, the first capacitor 200a may be provided and the two shared metallization layers 250ab, 250ac may then be formed thereon. In addition, screen printed carbon or other polymer layer may be formed on the metallization layers 250ab, 250ac, which will eventually become the back carbonaceous layer 240b-2 of the second capacitor 200b and the front carbonaceous layer 240c-1 of the third capacitor 200c and are labeled as such in FIG. 8. Referring to the upper part of FIG. 8, the conductive substrate 210b, dielectric layers 220b-1, 220b-2, and conductive polymer layers 230b-1, 230b-2 of the second capacitor 200b may be separately assembled, which may then be stacked on top of the carbonaceous layer 240b-2 as shown. While not separately shown, the conductive substrate 210c, dielectric layers 220c-1, 220c-2, and conductive polymer layers 230c-1, 230c-2 of the third capacitor 200c may be identically assembled, which may then be stacked on the bottom of the carbonaceous layer 240c-1. The resulting stack is shown in FIG. 9, which may then be screen printed on both sides or otherwise provided with the remaining carbonaceous layers 240b-1, 240c-2 (see also FIG. 7) to complete the three capacitors 200a, 200b, 200c as shown in FIG. 10 with the shared metallization layers 250ab, 250ac therebetween. Front and back metallization layers 250b, 250c may then be added as shown in FIG. 11.

Figure 12:
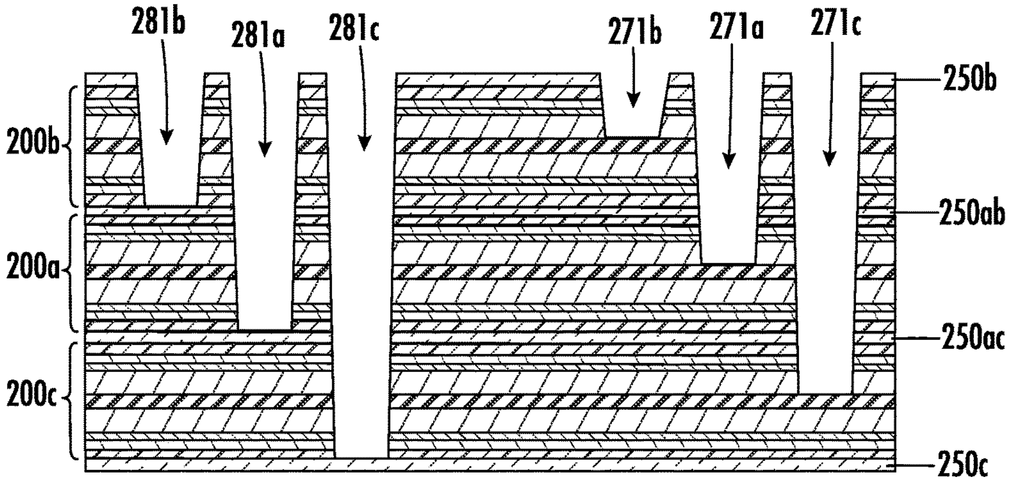
FIG. 12 is a cross-sectional view of another processing stage in manufacturing the IPD of FIG. 7.

The manufacturing process may continue with the drilling of vias 271a, 271b, 271c to the conductive substrates 210a, 210b, 210c and the drilling of vias 281a, 281b, 281c to the metallization layers 250ab, 250ac, 250c as shown in FIG. 12. After applying an insulating material 290 (see FIG. 7), which may be a thermosetting film such as an Ajinomoto Build-up Film (ABF), to surround the capacitors 200a, 200b, 200c, the vias 271a, 271b, 271c, 281a, 281b, 281c may be redrilled within the insulating material 290 to be filled with conductive via fill 272a, 272b, 272c, 282a, 282b, 282c as shown in FIG. 7. The metal contacts 270, 280 may then be formed on the outermost surfaces 2002, 2004 of the IPD 2000, electrically connecting the electrodes of the capacitors 200a, 200b, 200c to the outermost surfaces 2002, 2004 and advantageously providing the passthrough electrical connection as described above.

Figure 13:
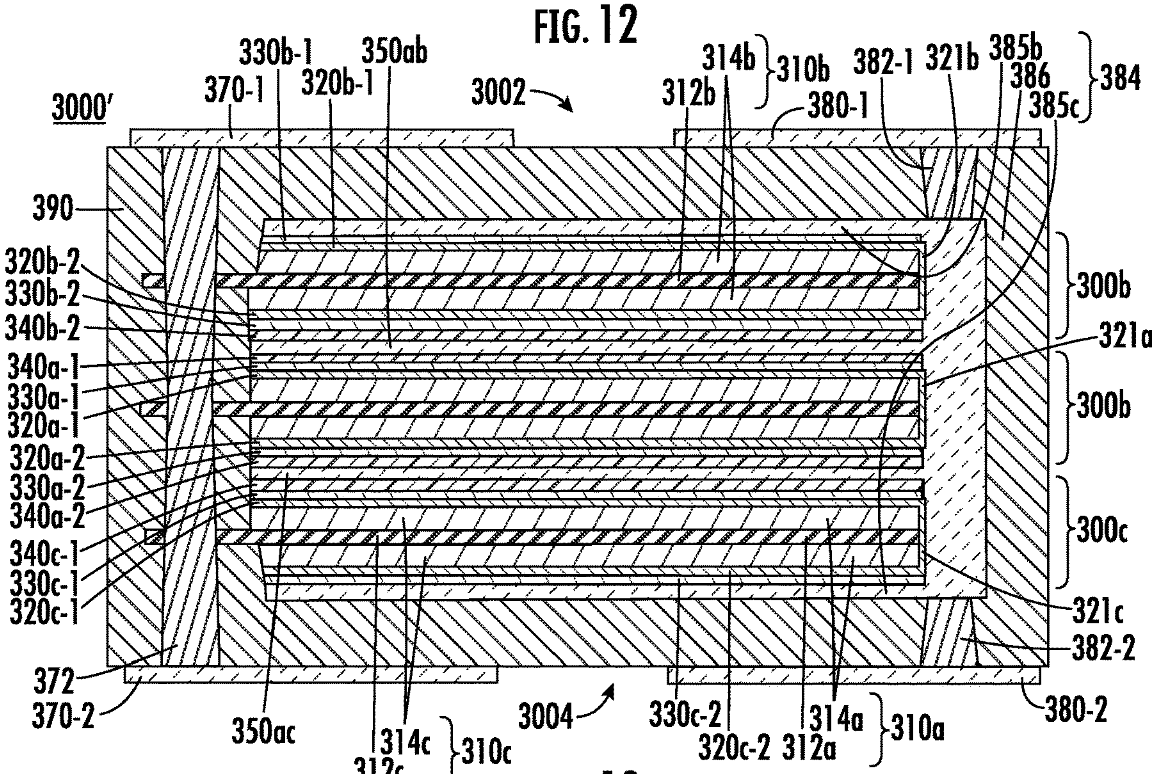
FIG. 13 is a cross-sectional view of another IPD according to an embodiment of the present disclosure.
Figure 14:
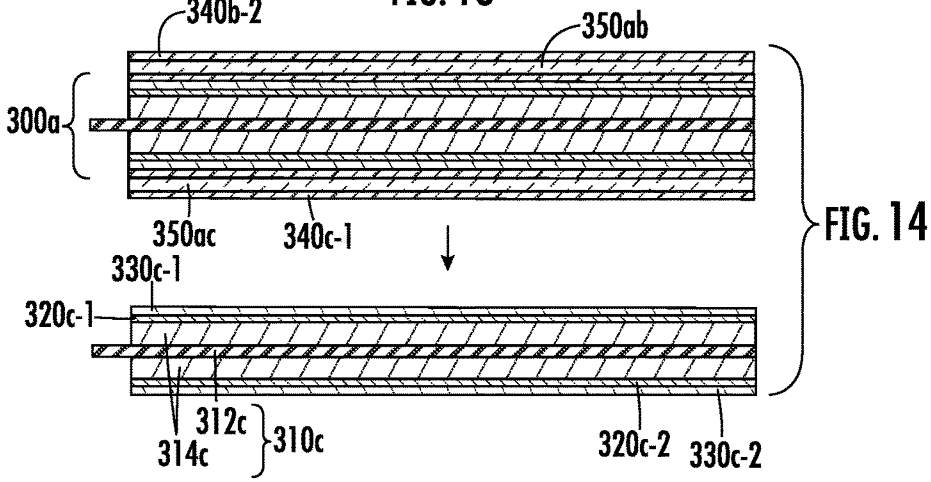
FIG. 14 is a cross-sectional view of a processing stage in manufacturing the IPD of FIG. 13.
Figure 15:
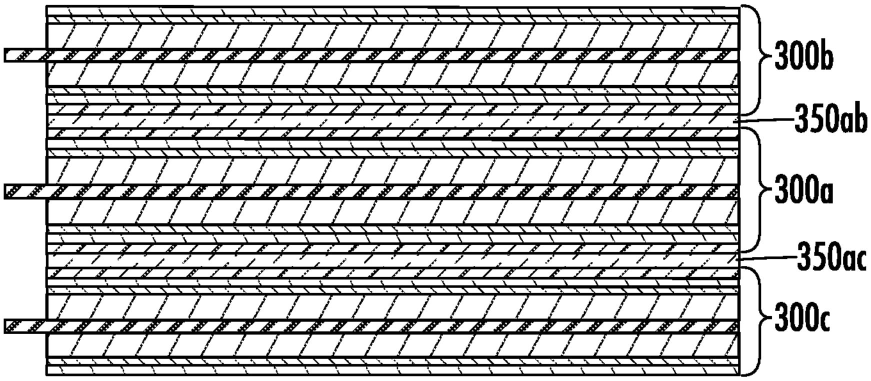
FIG. 15 is a cross-sectional view of another processing stage in manufacturing the IPD of FIG. 13.

FIG. 13 is a cross-sectional view of another IPD 3000 according to an embodiment of the present disclosure. Except as described herein, the IPD 3000 may be the same as the IPD 2000 and may include a first capacitor 300a, a second capacitor 300b stacked on the first capacitor 300a, and a third capacitor 300c stacked underneath the first capacitor 100a that are the same as the first, second, and third capacitors 200a, 200b, 200c. In this regard, it is noted that the capacitors 300a, 300b, 300c may comprise respective conductive substrates 310a, 310b, 310c (comprising solid metal portions 312a, 312b, 312c and high surface area portions 314a, 314b, 314c), along with respective front and back dielectric layers 320a-1, 320a-2, 320b-1, 320b-2, 320c-1, 320c-2, front and back conductive polymer layers 330a-1, 330a-2, 330b-1, 330b-2, 330c-1, 330c-2, and front and/or back carbonaceous layers 340a-1, 340a-2, 340b-2, 340c-1 that are the same as the substrates 210a, 210b, dielectric layers 220a-1, 220a-2, 220b-1, 220b-2, 220c-1, 220c-2, conductive polymer layers 230a-1, 230a-2, 230b-1, 230b-2, 230c-1, 230c-2, and carbonaceous layers 240a-1, 240a-2, 240b-2, 240c-1 described in relation to FIGS. 7-12. The capacitors 300a, 300b, 300c may similarly be defined without metallization layers for ease of reference since the metallization layers will be shared in the completed IPD 3000. In particular, the capacitors 300a, 300b, 300c may be bonded together by shared metallization layers 350ab, 350ac in the same way as the capacitors 200a, 200b, 200c. In the illustrated example, the second and third capacitors 300b, 300c include carbonaceous layers only on their interior sides, but the use of exterior carbonaceous layers is contemplated as well.

The IPD 3000 may be incorporated into energy storage structures, filters, or other circuit components by way of a first metal contact 370-1 that is electrically connected to the conductive substrates 310a, 310b, 310c of the first, second, and/or third capacitors 300a, 300b, 300c and by a second metal contact 380-1 that is electrically connected to a termination pad 384 comprising a front conductive portion 385b, a back conductive portion 385c, and a sidewall conductive portion 386. The second metal contact 380-1 may be electrically isolated from the first metal contact 370-1 and electrically connected to the front and back conductive polymer layers 330a-1, 330a-2, 330b-1, 330b-2, 330c-1, 330c-2 of the first, second, and/or third capacitors 300a, 300b, 300c via the termination pad 384. Third and fourth metal contacts 370-2, 380-2 may also be provided on the back side 3004 of the IPD 3000 as shown. Connection of the conductive substrates 310a, 310b, 310c to the first and third metal contacts 370-1, 370-2 may be established by drilling a through via through the conductive substrates 310a, 310b, 310c and providing a conductive via fill 372 as shown, while connection of the termination pad 384 to the second and fourth metal contacts 380-1, 380-2 may be established by drilling two blind vias and providing conductive via fills 382-1, and 382-2 as shown. Advantageously, no vias through the conducive polymer layers 330a-1, 330a-2, 330b-1, 330b-2, 330c-1, 330c-2 may be necessary to establish connections between the metal contacts 370-1, 370-2, 380-1, 380-2 and the various internal structures of the IPD 3000. A first passthrough electrical connection may extend from the first metal contact 370-1 to the third metal contact 370-2 by way of the conductive via fill 372. A second passthrough electrical connection may extend from the second metal contact 380-1 to the second metal contact 380-2 by way of the sidewall conductive portion 386 of the termination pad 384 and the conductive via fills 382-1, 382-2.

Example processing stages for manufacturing the IPD 3000 are illustrated in FIGS. 14-17. First, as shown in the lower part of FIG. 14, the process may begin with providing the first capacitor 300*a* and forming the two shared metallization layers 350*ab*, 350*ac* thereon. In addition, screen printed carbon may be formed on the metallization layers 350*ab*, 350*ac*, which will eventually become the back carbonaceous layer 340*b*-2 of the second capacitor 300*b* and the front carbonaceous layer 340*c*-1 of the third capacitor 300*c* and are labeled as such in FIG. 14. Referring to the lower part of FIG. 14, the conductive substrate 310*b*, dielectric layers 320*b*-1, 320*b*-2, and conductive polymer layers 330*b*-1, 330*b*-2 of the second capacitor 300*b* may be separately assembled, which may then be stacked on top of the carbonaceous layer 340*b*-2 as shown. While not separately shown, the conductive substrate 310*c*, dielectric layers 320*c*-1, 320*c*-2, and conductive polymer layers 330*c*-1, 330*c*-2 of the third capacitor 300*c* may be identically assembled, which may then be stacked on the bottom of the carbonaceous layer 340*c*-1. The resulting stack of three capacitors 300*a*, 300*b*, 300*c* (which may in some cases omit outer carbonaceous layers as noted above) is shown in FIG. 15, with the shared metallization layers 350*ab*, 350*ac* therebetween. In order to provide a suitable area for subsequent formation of the conductive via fill 372 (see FIG. 13), it is noted that the conductive substrates 310*a*, 310*b*, 310*c* or solid metal portions 312*a*, 312*b*, 312*c* thereof may extend past the region of the core layer buildup as shown.

Figure 16:
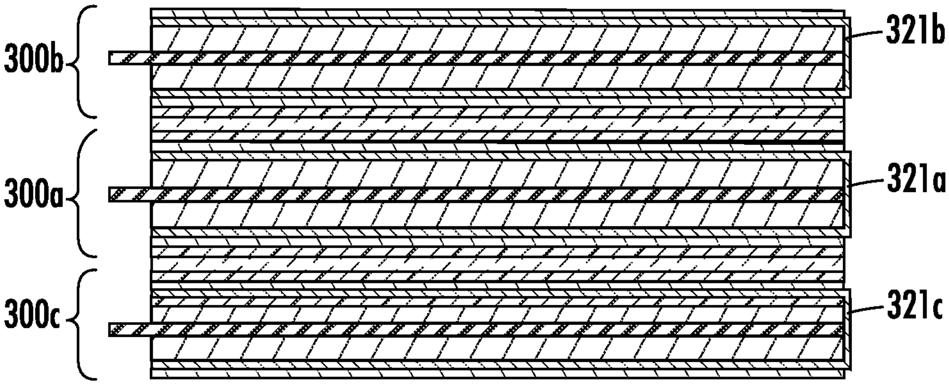
FIG. 16 is a cross-sectional view of another processing stage in manufacturing the IPD of FIG. 13.
Figure 17:
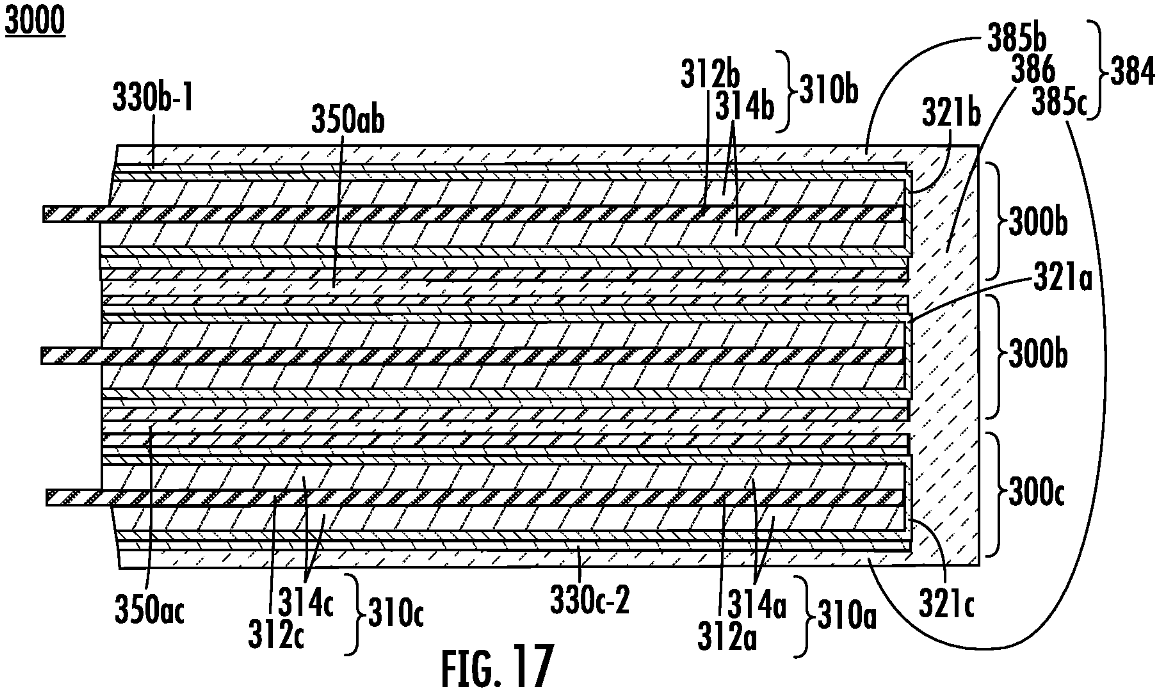
FIG. 17 is a cross-sectional view of another processing stage in manufacturing the IPD of FIG. 13.

The manufacturing process may continue with formation of sidewall dielectric layers 321*a*, 321*b*, 321*c* on sidewalls of the respective conductive substrates 310*a*, 310*b*, 310*c* as shown in FIG. 16. The sidewall dielectric layers 321*a*, 321*b*, 321*c* may be formed by an anodization process, for example. As shown in FIG. 17, the termination pad 384 may then be formed by tinning or dipping the stacked capacitors 300*a*, 300*b*, 300*c* into a conductive material. The termination pad 384 may electrically connect the metallization layers 350*ab*, 350*ac* together to create a continuous conductive region that surrounds the stack of capacitors 300*a*, 300*b*, 300*c* and includes the sidewall conductive portion 386, the front and back conductive portions 385*b*, 385*c*, and the shared metallization layers 350*ab*, 350*ac* between the capacitors 300*a*, 300*b*, 300*c*. The termination pad 384 may be electrically connected to the conductive polymer layers 330*a*-1, 330*a*-2, 330*b*-1, 330*b*-2, 330*c*-1, 330*c*-2 (e.g., the cathode) by the shared metallization layers 350*ab*, 350*ac* and by the front and back conductive portions 385*b*, 385*c* (optionally with intervening carbonaceous layers), while being electrically isolated from the conductive substrates 310*a*, 310*b*, 320*c* (e.g., the anode) by the sidewall dielectric layers 321*a*, 321*b*, 321*c*. Lastly, referring back to FIG. 13, the insulating material 390 (e.g., ABF lamination) may be provided and the vias drilled and filled with conductive via fill 372, 382-1, 382-2, followed by formation of the metal contacts 370-1, 370-2, 380-1, 380-2. Advantageously, the structures and processes represented by FIGS. 13-17 may easily be scaled up to any number of stacked capacitors.

Figure 18:
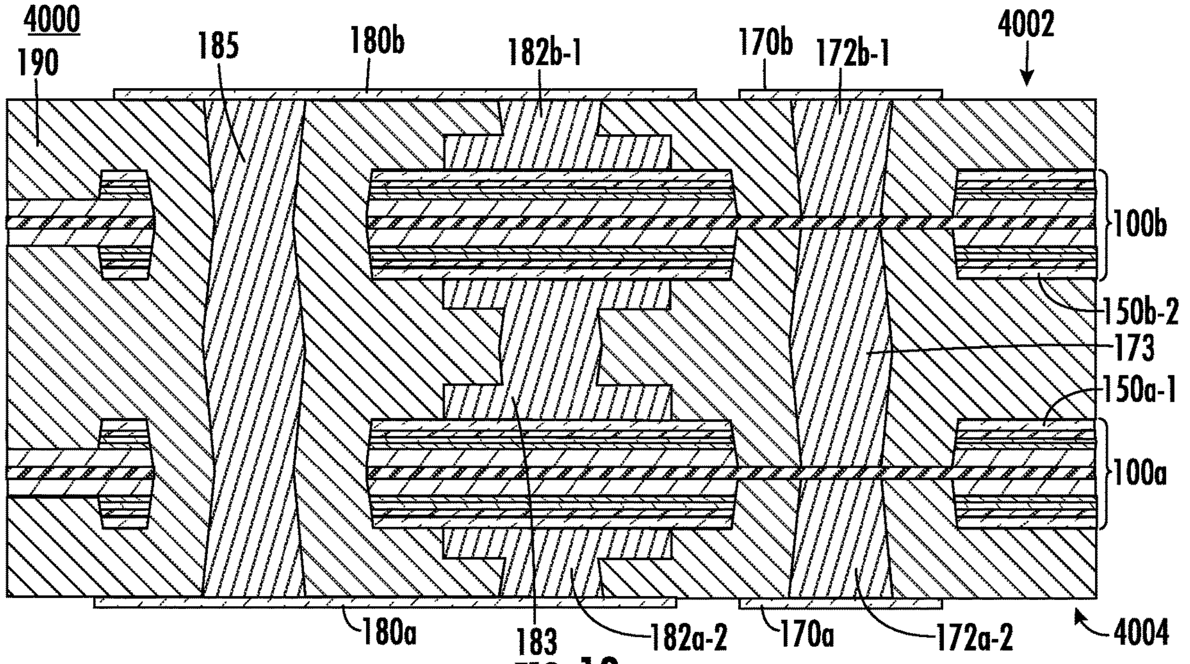
FIG. 18 is a cross-sectional view of another IPD according to an embodiment of the present disclosure.

FIG. 18 is a cross-sectional view of another IPD 4000 according to an embodiment of the present disclosure. Except as described herein, the IPD 4000 may be the same as the IPD 1000 and may include the same first capacitor 100*a* and second capacitor 100*b* as described above, with the second capacitor 100*b* being stacked on the first capacitor 100*a*. However, unlike in the case of the IPD 1000 (or IPD 1000'), where the first and second capacitors 100*a*, 100*b* are bonded together at the core level (i.e., prior to integration), and unlike the IPDs 2000, 3000, the IPD 4000 may instead be made by bonding the capacitors 100*a*, 100*b* together at the integration stage. In particular, as shown in FIG. 18, the front metallization layer 150*a*-1 of the first capacitor 100*a* may be bonded to the back metallization layer 150*b*-2 of the second capacitor 100*b* by a conductive paste. Advantageously, and as described in more detail below, the conductive paste may be the same conductive via fill 173, 183, 185 that would ordinarily be used to fill vias for external connections to the electrodes of the individual capacitors 100*a*, 100*b* and may, accordingly, be applied by the same processes (irrespective of whether the capacitors 100*a*, 100*b* will be stacked).

Figure 19:
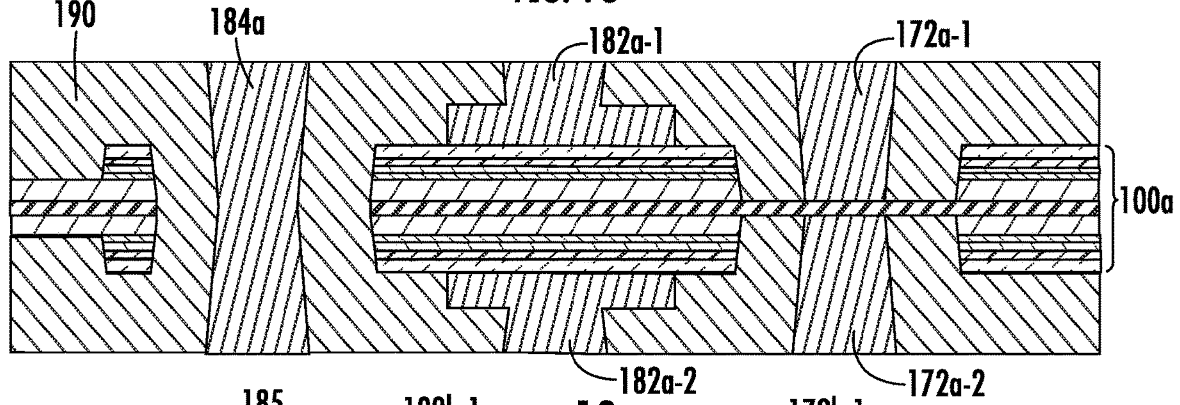
FIG. 19 is a cross-sectional view of a processing stage in manufacturing the IPD of FIG. 18.
Figure 20:
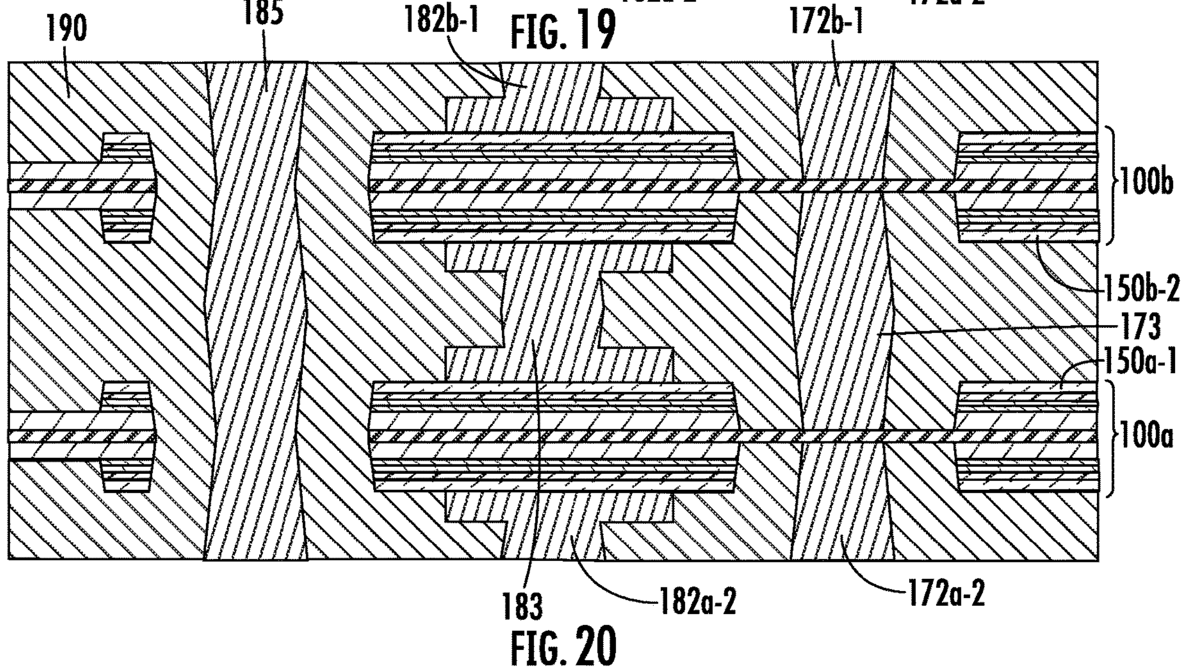
FIG. 20 is a cross-sectional view of another processing stage in manufacturing the IPD of FIG. 18.

Example processing stages for manufacturing the IPD 4000 are illustrated in FIGS. 19 and 20. First, as shown in FIG. 19, the process may begin with laser processing the first capacitor 100*a*, applying insulating material 190, and redrilling of vias to establish electrical connections between the electrodes of the capacitor 100*a* and the outside. In particular, as shown in FIG. 19, blind vias may be formed (right-hand side of FIG. 19) to be filled with conductive via fill 172*a*-1 and 1721-2 connecting front and back sides of the conductive substrate 110*a* to the outside, additional blind vias may be formed (middle of FIG. 19) to be filled with conductive via fill 182*a*-1, 182*a*-2 electrically connecting the respective front and back conductive polymer layers 130*a*-1, 130*a*-2 to the outside (e.g., by way of intervening carbonaceous and metallization layers), and a through via may be formed (left-hand side of FIG. 19) to be filled with conductive via fill 184*a* to provide a passthrough connection. At this stage, instead of providing metal contacts to complete the connections and allow the capacitor 100*a* to be connected to an external circuit, the manufacturing process may instead proceed with stacking second identically formed capacitor 100*b* (including insulating material and via fill) on the first capacitor 100*a* as shown in FIG. 20.

The two (or more) capacitors 100*a*, 100*b* may then be bonded together (e.g., by metal sintering) at the abutting via fills. The front conductive via fill 172*a*-1 of the first capacitor 100*a* may thus combine with back conductive via fill of the second capacitor 100*b* (not separately shown but identical to the back conductive via fill 172*a*-2 of the first capacitor 100*a*) to form the via fill 173. The front conductive via fill 182*a*-1 of the first capacitor 100*a* may similarly combine with back conductive via fill of the second capacitor 100*b* (not separately shown but identical to the back conductive via fill 182*a*-2 of the first capacitor 100*a*) to form the via fill 183. The through via fill 184*a* of the first capacitor 100*a* may likewise combine with identically formed through via fill of the second capacitor 100*b* to form the conductive via fill 185. Lastly, the metal contacts 170*a*, 170*b*, 180*a*, 180*b* may be formed as shown in FIG. 18. In this way, the bonding of the two capacitors 100*a*, 100*b* together to form the stack may leverage the copper paste that may otherwise already be provided to form the external connections of each individual capacitor 100*a*, 100*b*. Moreover, the IPD 4000 may advantageously comprise a passthrough electrical connection between the front and back outer surfaces 4002, 4004 of the IPD 4000 extending all the way from the first metal contact 170*b* on the front outer surface 4002 of the IPD 4000 to the third metal contact 170*a* on the back outer surface 4004 of the IPD 4000 by way of the conductive substrates 110*a*, 110*b* and the conductive via fills 172*b*-1, 173, and 172*a*-2. The IPD 4000 may also comprise a passthrough electrical connection between the front and back outer surfaces 4002, 4004 of the IPD 4000 extending all the way from the second metal contact 180*b* on the front outer surface 4002 of the IPD 4000 to the fourth metal contact 180*a* on the back outer surface 4004 of the IPD 4000 by way of the conductive via fill 185.

Figure 21:
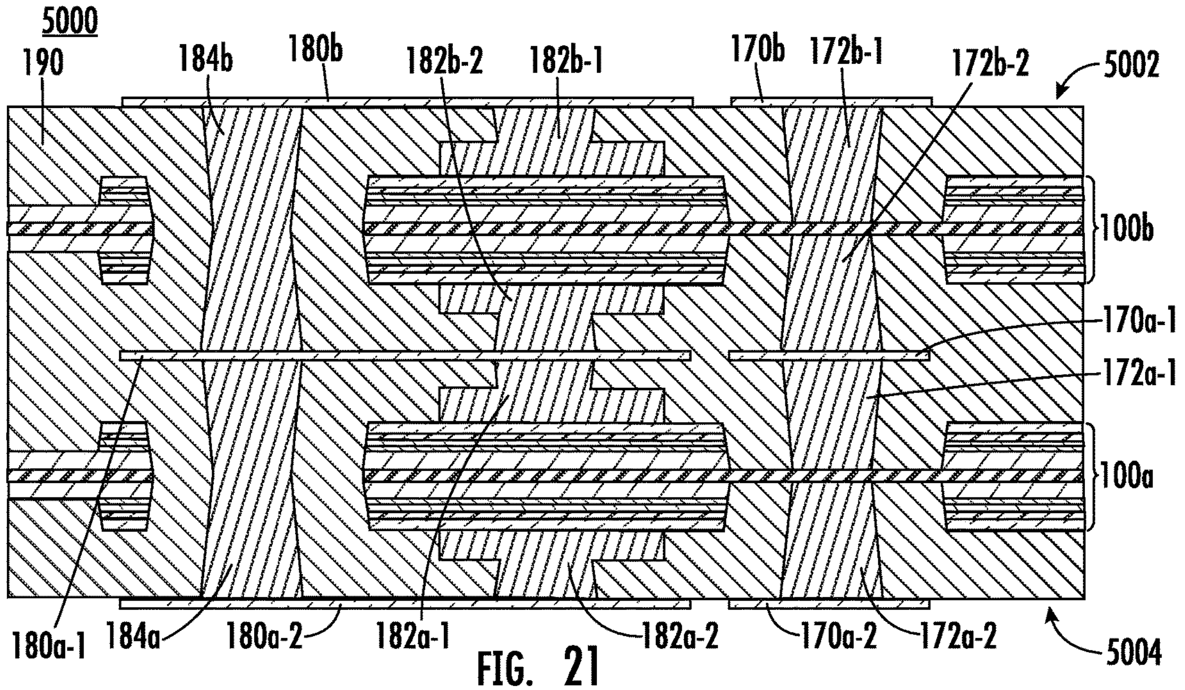
FIG. 21 is a cross-sectional view of another IPD according to an embodiment of the present disclosure.
Figure 22:
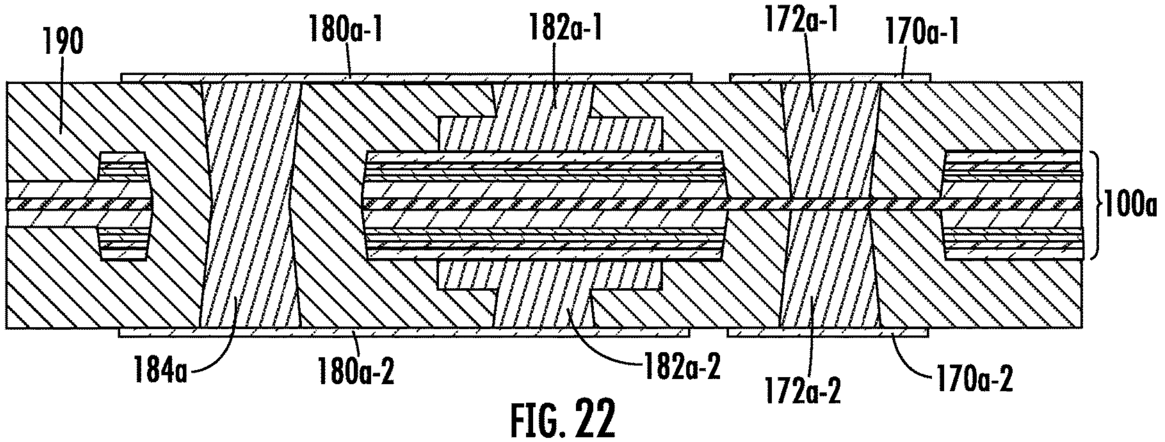
FIG. 22 is a cross-sectional view of a processing stage in manufacturing the IPD of FIG. 21.
Figure 23:
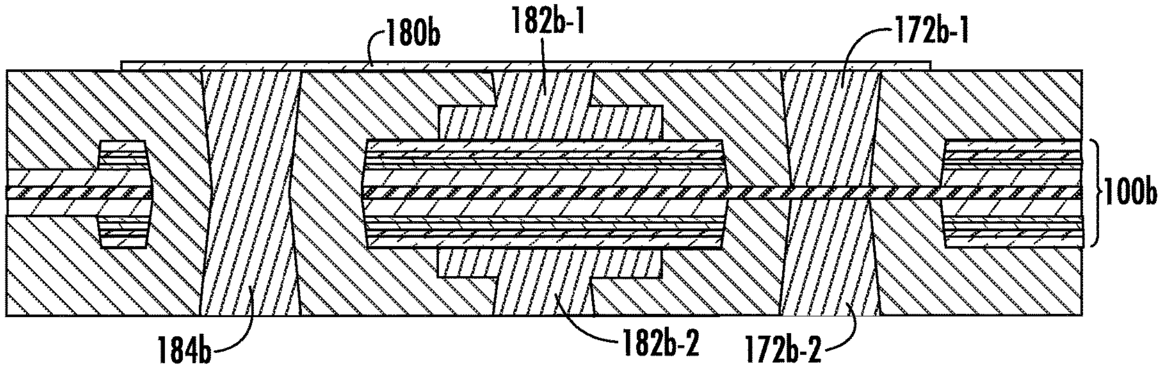
FIG. 23 is a cross-sectional view of another processing stage in manufacturing the IPD of FIG. 21.

FIG. 21 is a cross-sectional view of another IPD 5000 according to an embodiment of the present disclosure. FIGS. 22 and 23 are cross-sectional views of respective processing stages in manufacturing the IPD 5000 of FIG. 21. The IPD 5000 may be the same as the IPD 4000 and may be made by processing steps that are the same as those described above in relation to FIGS. 19 and 20 except that the stacking of the capacitors 100*a*, 100*b* is done after formation of metal contacts on the outsides of some or all of the individual capacitors 100*a*, 100*b* in the case of the IPD 5000. As such, rather than using the conductive paste of the via fills as bonding material as in the IPD 4000, the IPD 5000 uses the interface between the conductive paste of one capacitor and the metal contacts of another (or in some cases may bond metal contacts of both capacitors). As illustrated in FIG. 21 by way of example, the sandwiched metal contact of one (or both) of the capacitors 100*a*, 100*b* becomes embedded in the IPD 5000 as metal contact layers 170*a*-1 and 180*a*-1 and surrounded by the insulating material 190. The IPD 5000 may still advantageously include a passthrough electrical connection from the first metal contact 170*b* on the front outer surface 5002 of the IPD 5000, through the conductive via fill 172*b*-1, the conductive substrate 110*b*, the conductive via fill 172*b*-2, the metal contact layer 170*a*-1, the conductive via fill 172*a*-1, the conductive substrate 110*a*, and the conductive via fill 172*a*-2 to the third metal contact 170*a*-2 on the back outer surface 5004 of the IPD 5000. The IPD 5000 may likewise still include a passthrough electrical connection from the second metal contact 180*b* on the front outer surface 5002, through the conductive via fill 184*b*, the metal contact layer 180*a*-1, and the conductive via fill 184*a*, to the fourth metal contact 180*a*-2 on the back outer surface 5004.

As shown in FIG. 22, manufacturing the IPD 5000 may begin in the same way as manufacturing the IPD 4000 (see FIG. 19), except that the integration of the individual capacitor 100*a* may be completed with the formation of metal contacts 170*a*-1, 170*a*-2, 180*a*-1, 180-2. As shown in FIG. 23, an identical capacitor 100*b* may be formed and completed through the integration stage with the optional omission of metal contacts on one side (the bottom in FIG. 23, corresponding to the back of the capacitor 100*b*). Lastly, as shown in FIG. 21, the capacitor 100*b* may be stacked on the capacitor 100*a* and the two (or more) capacitors 100*a*, 100*b* may be bonded together (e.g., by metal sintering) where the via fills 172*b*-2, 182*b*-2, 184*b* of the second capacitor 100*b* abut the front metal contacts 170*a*-1, 180*a*-1 of the first capacitor 100*a*.

Figure 24:
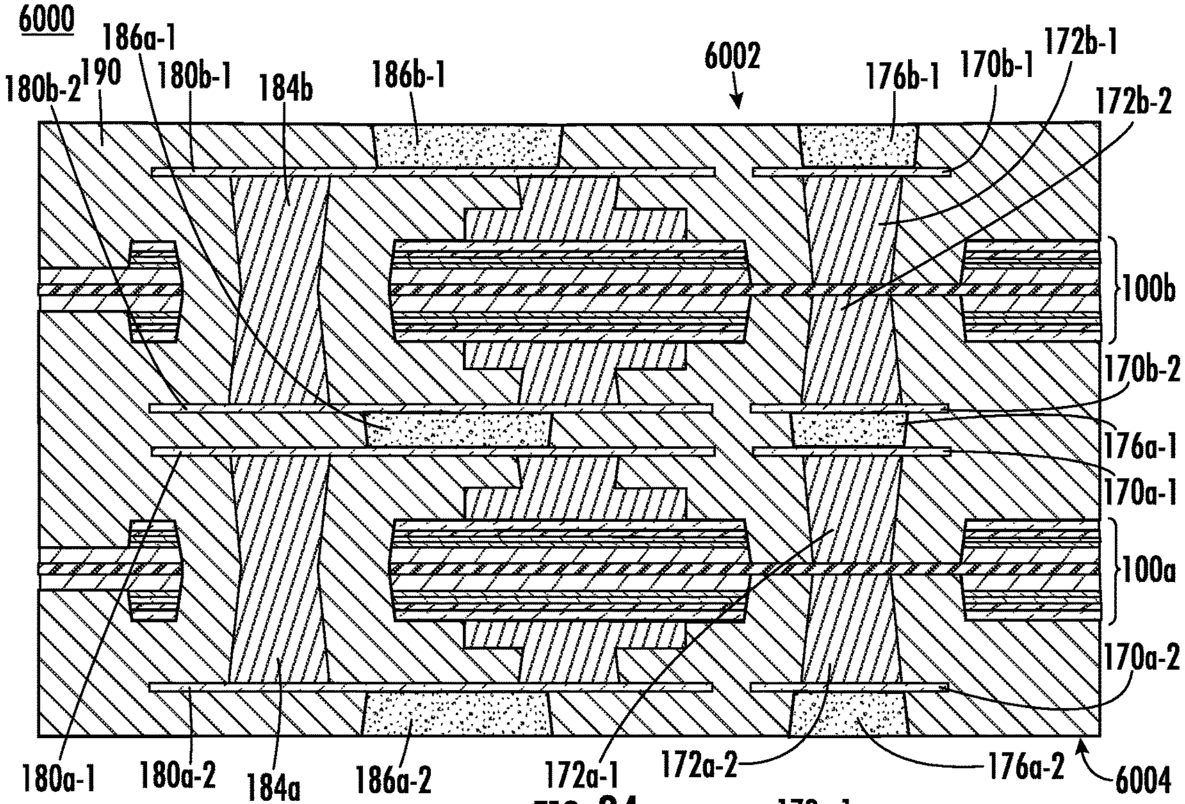
FIG. 24 is a cross-sectional view of another IPD according to an embodiment of the present disclosure.
Figure 25:
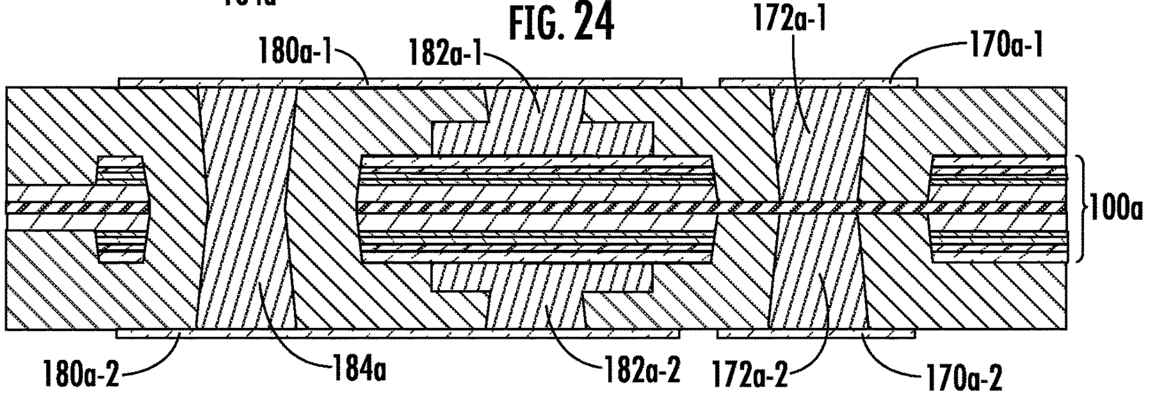
FIG. 25 is a cross-sectional view of a processing stage in manufacturing the IPD of FIG. 24.
Figure 26:
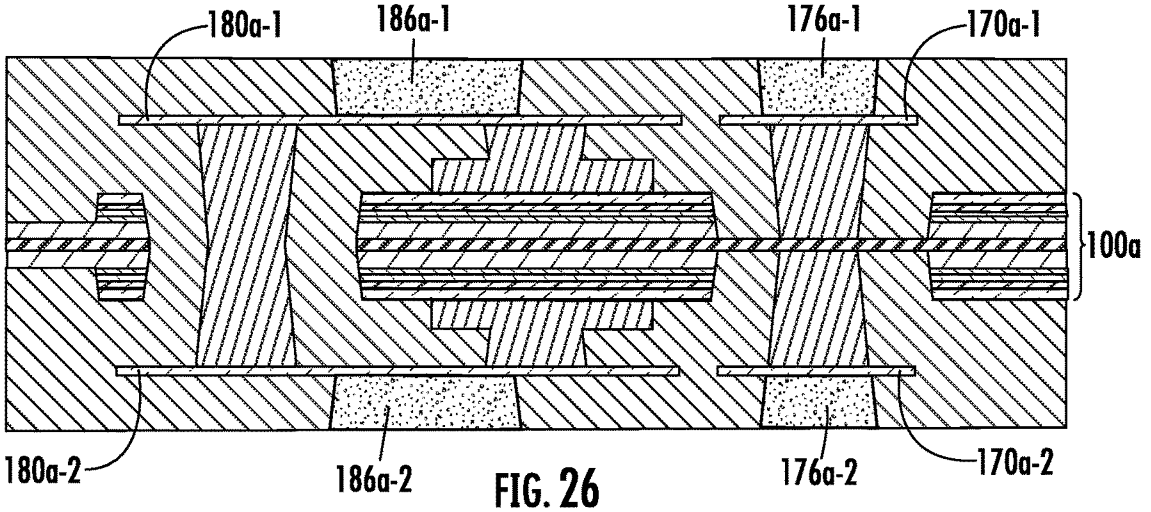
FIG. 26 is a cross-sectional view of another processing stage in manufacturing the IPD of FIG. 24.

FIG. 24 is a cross-sectional view of another IPD 6000 according to an embodiment of the present disclosure. FIGS. 25 and 26 are cross-sectional views of respective processing stages in manufacturing the IPD 6000 of FIG. 24. As noted above in relation to the IPD 5000 of FIGS. 21-23, the omission of metal contacts on some sides of the capacitors to be stacked may be optional and may, advantageously, allow the conductive paste of the via fills to bond with the metal contacts (where the metal contacts themselves might be more difficult to bond). FIG. 24 represents a variant in which the metal contacts are not omitted on any of the capacitors to be stacked, such that each capacitor 100*a*, 100*b* may be completed as if it were a standalone capacitor having front and back metal contacts prior to stacking. Thus, as illustrated in FIG. 24, the sandwiched metal contacts of both of the capacitors 100*a*, 100*b* become embedded in the IPD 5000 as metal contact layers 170*a*-1, 180*a*-1, 170*b*-2, and 180*b*-2 and surrounded by the insulating material 190. Electrical connection and bonding between the metal contact layers 170*a*-1 and 170*b*-2 may be made by way of solder 176*a*-1, and electrical connection and bonding between the metal contact layers 180*a*-1 and 180*b*-2 may be made by way of solder 186*a*-1, with the solder 176*a*-1, 186*a*-1 likewise being surrounded by the insulating material 190. Along the same lines, the outer metal contacts of the individual capacitors 100*a*, 100*b* may likewise be embedded within the insulating material 190 to become metal contact layers 170*b*-1, 180*b*-1, 170*a*-2, and 180*a*-2, with electrical connection to the outside of the device being established by solder 176*b*-1, 186*b*-1, 176*a*-2, and 186*a*-2, respectively.

The IPD 6000 may still advantageously include a passthrough electrical connection from the solder 176*b*-1 at the front outer surface 6002 of the IPD 6000 all the way to the solder 176*a*-2 at the back outer surface 6004 of the IPD 6000 through the metal contact layer 170*b*-1, the conductive via fill 172*b*-1, the conductive substrate 110*b*, the conductive via fill 172*b*-2, the metal contact layer 170*b*-2, the solder 176*a*-1, the metal contact layer 170*a*-1, the conductive via fill 172*a*-1, the conductive substrate 110*a*, the conductive via fill 172*a*-2, and the metal contact layer 170*a*-2 as shown on the right-hand side of FIG. 24. The IPD 6000 may likewise still include a passthrough electrical connection from the solder 186*b*-1 at the front outer surface 6002 of the IPD 6000 all the way to the solder 186*a*-2 at the back outer surface 6004 of the IPD 6000 through the metal contact layer 180*b*-1, the conductive via fill 184*b*, the metal contact layer 180*b*-2, the solder 186*a*-1, the metal contact layer 180*a*-1, the conductive via fill 184*a*, and the metal contact layer 180*a*-2 as shown on the left-hand side of FIG. 24.

Referring to FIG. 25, manufacturing the IPD 6000 may begin in exactly the same way as manufacturing the IPD 5000 (see FIG. 22), with the integration of the individual capacitor 100*a* completed with the formation of metal contacts 170*a*-1, 170*a*-2, 180*a*-1, 180-2. An identical capacitor 100*b* may be formed and completed through the integration stage, differing from the IPD 5000 only in that no metal contacts are omitted. As shown in FIG. 26, solder 176*a*-1, 176*a*-2, 186*a*-1, 186*a*-2 may be added respectively to the metal contacts 170*a*-1, 170*a*-2, 180*a*-1, 180-2 and surrounded by the insulating material 190. The same can identically be done in the case of the capacitor 100*b*, or alternatively solder may be omitted from one side of the capacitor 100*b* (e.g., only the front solder 176*b*-1, 186*b*-1 may be applied). Lastly, referring to FIG. 24, the capacitor 100*b* may be stacked on the capacitor 100*a* and the two (or more) capacitors 100*a*, 100*b* may be bonded together by the intervening solder 176*a*-1, 186*a*-1. If solder was applied to both sides of the capacitor 100*b*, then the solder 176*a*-1, 186*a*-1 may simply combine with and bond with the back side solder of the capacitor 100*b*.

Figure 27:
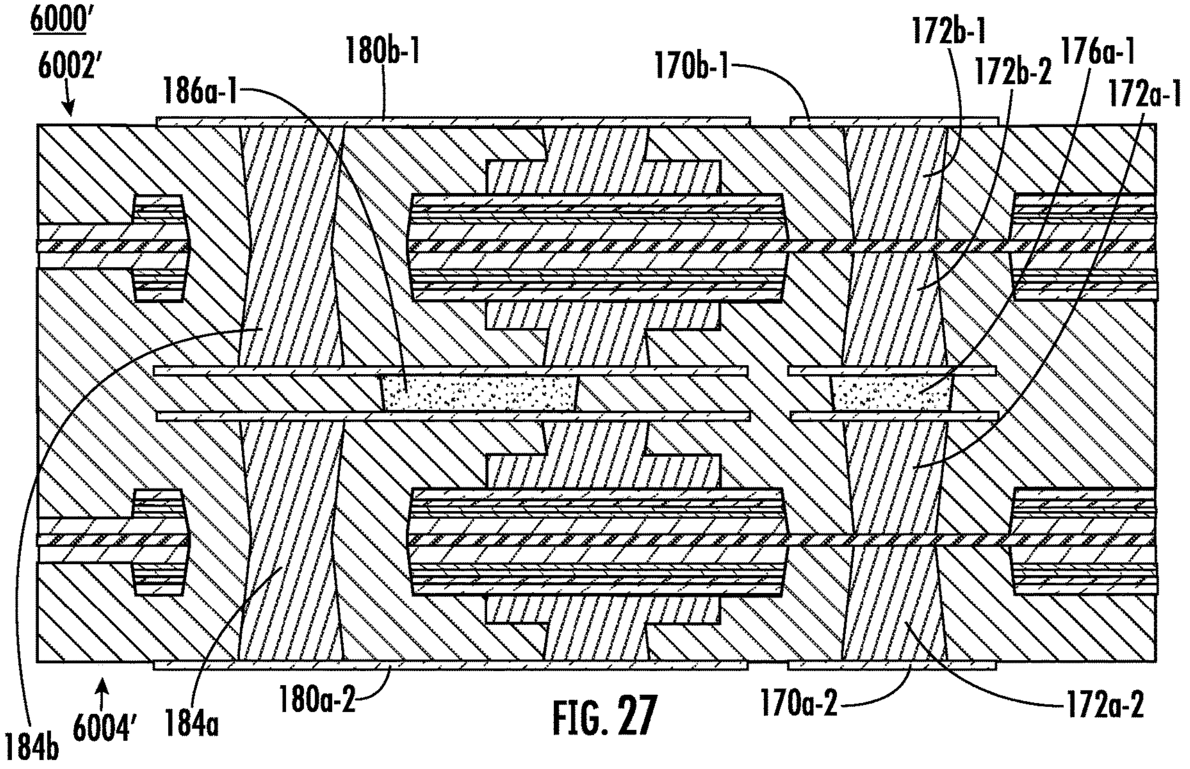
FIG. 27 is a cross-sectional view of another IPD according to an embodiment of the present disclosure.
Figure 28:
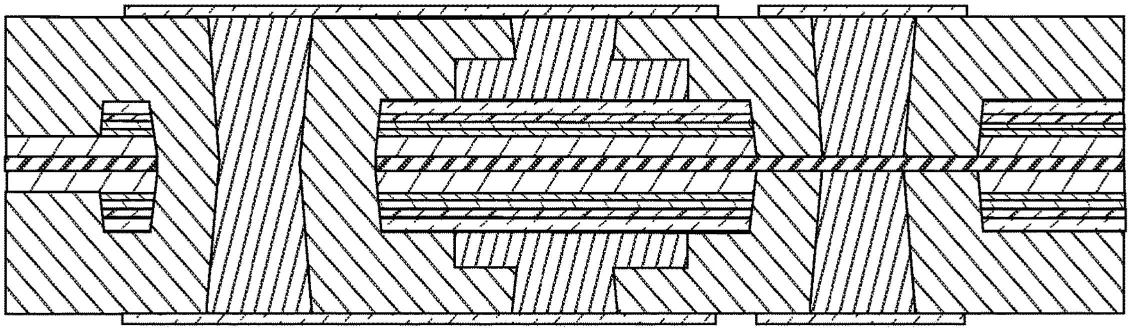
FIG. 28 is a cross-sectional view of a processing stage in manufacturing the IPD of FIG. 27.
Figure 29:
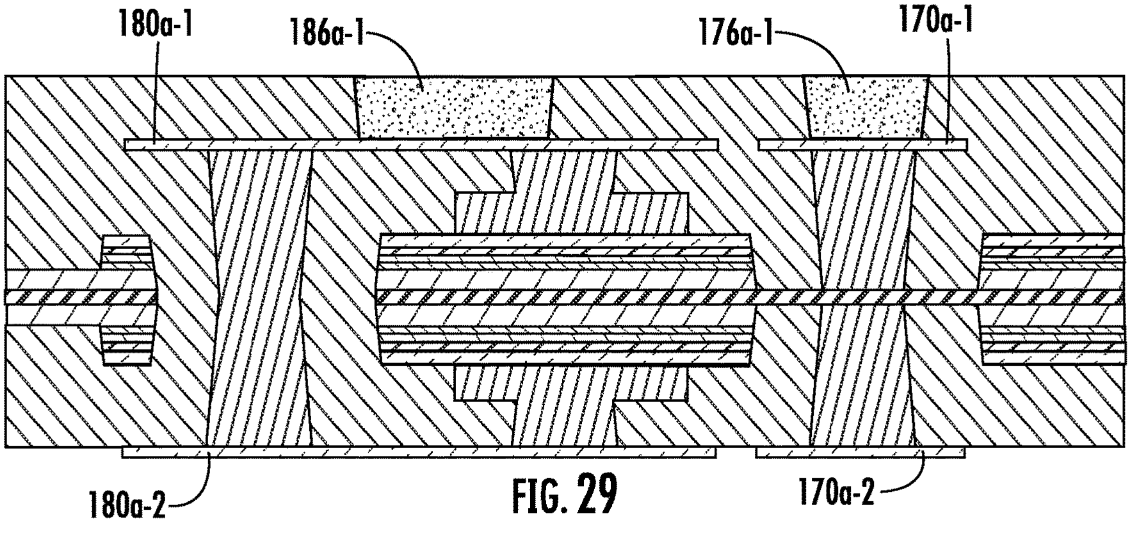
FIG. 29 is a cross-sectional view of another processing stage in manufacturing the IPD of FIG. 27.

FIG. 27 is a cross-sectional view of another IPD 6000' according to an embodiment of the present disclosure. FIGS. 28 and 29 are cross-sectional views of respective processing stages in manufacturing the IPD 6000' of FIG. 27. The IPD 6000' may be a variant of the IPD 6000, differing only in the omission of the outermost solder 176*b*-1, 186*b*-1, 176*a*-2, 186*a*-2 and the leaving of the metal contacts 170*b*-1, 180*b*-1,

170*a*-2, 180*a*-2 exposed (i.e., not embedded in the insulating material 190). As shown in FIG. 28, manufacturing the IPD 6000' may begin in exactly the same way as manufacturing the IPD 6000 (see FIG. 25), with the integration of the individual capacitor 100*a* completed with the formation of metal contacts 170*a*-1, 170*a*-2, 180*a*-1, 180-2. The capacitor 100*b* may be made in the same way. However, in the subsequent stage shown in FIG. 29, solder may be applied on only one side of one of the two devices 100*a*, 100*b* (or on abutting sides of both). For example, solder 176*a*-1 and 186*a*-1 may be applied respectively to the metal contacts 170*a*-1 and 180*a*-1 of the first capacitor 100*a*, with the insulating material 190 filled in around the solder 186*a*-1, 176*a*-1. As a result, in the finished IPD 6000' shown in FIG. 27, the solder 170*a*-1, 180*a*-1 may similarly bond the capacitors 100*a*, 100*b* together, but the metal contacts 170*b*-1, 180*b*-1, 170*a*-2, 180*a*-2 may remain exposed to be used to connect the IPD 6000' to external devices. Advantageously, the IPD 6000' may have shorter path lengths than the IPD 6000, as well as fewer interfaces that could potentially lead to failure in solder joints, making the IPD 6000' potentially more reliable than the IPD 6000.

As can be appreciated, the IPD 6000' may still include a passthrough electrical connection from the metal contact 170*b*-1 at the front outer surface 6002' of the IPD 6000' all the way to the metal contact 170*a*-2 at the back outer surface 6004' of the IPD 6000' through the conductive via fill 172*b*-1, the conductive substrate 110*b*, the conductive via fill 172*b*-2, the metal contact layer 170*b*-2, the solder 176*a*-1, the metal contact layer 170*a*-1, the conductive via fill 172*a*-1, the conductive substrate 110*a*, and the conductive via fill 172*a*-2 as shown on the right-hand side of FIG. 24. The IPD 6000' may likewise still include a passthrough electrical connection from the metal contact 180*b*-1 at the front outer surface 6002' of the IPD 6000' all the way to the metal contact 180*a*-2 at the back outer surface 6004' of the IPD 6000' through the conductive via fill 184*b*, the metal contact layer 180*b*-2, the solder 186*a*-1, the metal contact layer 180*a*-1, and the conductive via fill 184*a* as shown on the left-hand side of FIG. 24.

It is contemplated that any of the IPDs 1000, 1000', 2000, 3000, 4000, 5000, 6000, 6000' described in relation to FIGS. 1-29 may include additional stacked capacitors beyond the illustrated capacitors 100*a*, 100*b*, beyond the illustrated capacitors 200*a*, 200*b*, 200*c* of the IPD 2000, or beyond the illustrated capacitors 300*a*, 300*b*, 300*c* of the IPD 3000. That is, both the pre-integration stacking of FIGS. 1-17 and the integration stage stacking of FIGS. 18-29 may be extended to include additional layers by repeating the same stacking methodologies and duplicating the various bonding materials and methods that are described. In addition to this, it is further contemplated that the pre-integration stacking methodologies may in some cases be combined with the integration stage stacking methodologies to produce various hybrid stacks as described below by way of example in relation to FIGS. 30-39.

Figure 30:
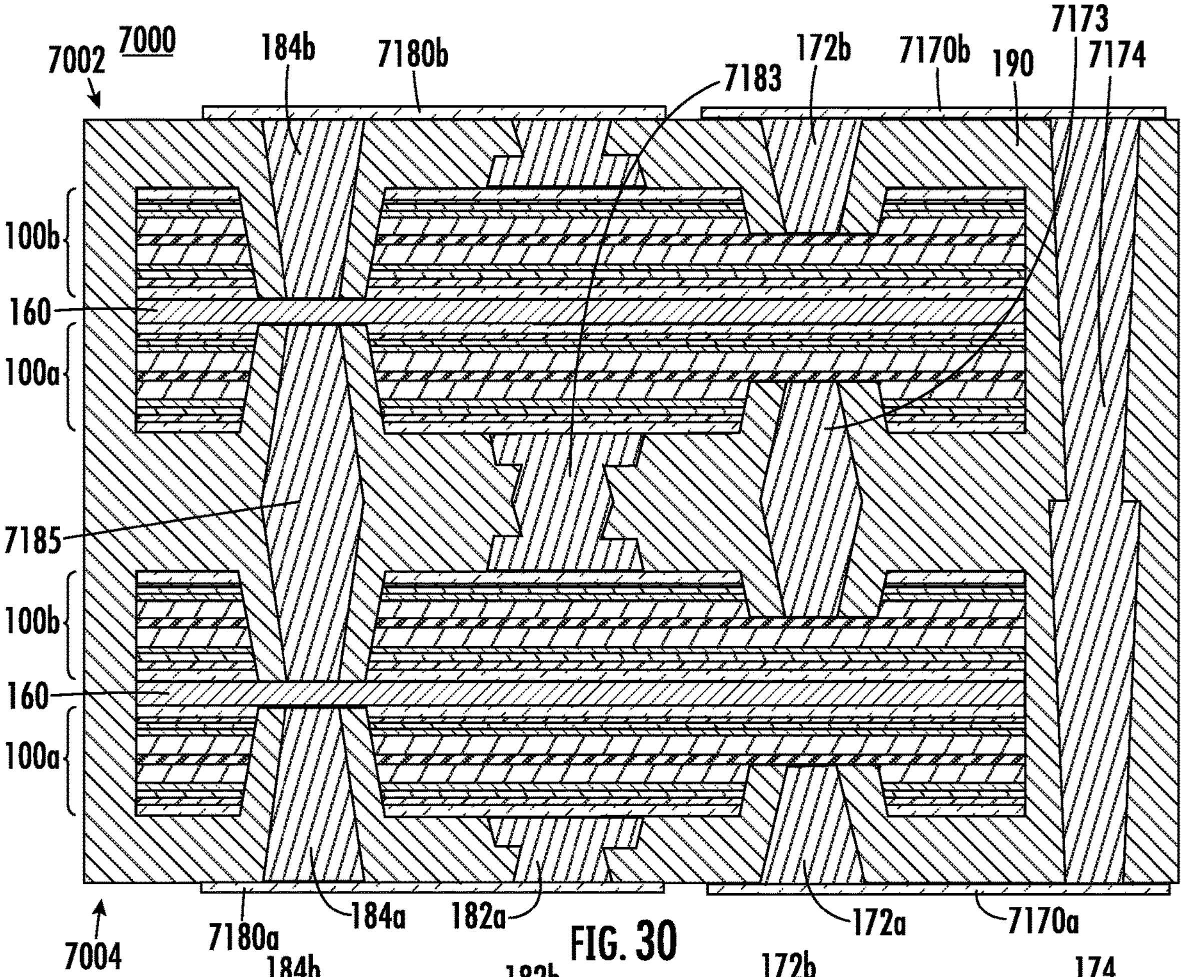
FIG. 30 is a cross-sectional view of another IPD according to an embodiment of the present disclosure.
Figure 31:
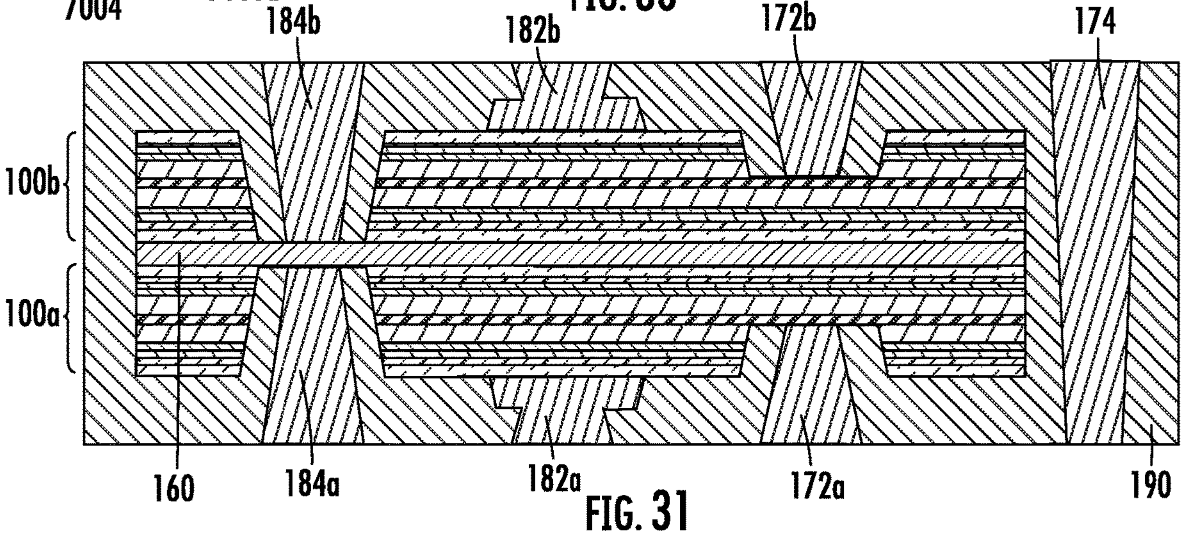
FIG. 31 is a cross-sectional view of a processing stage in manufacturing the IPD of FIG. 30.
Figure 32:
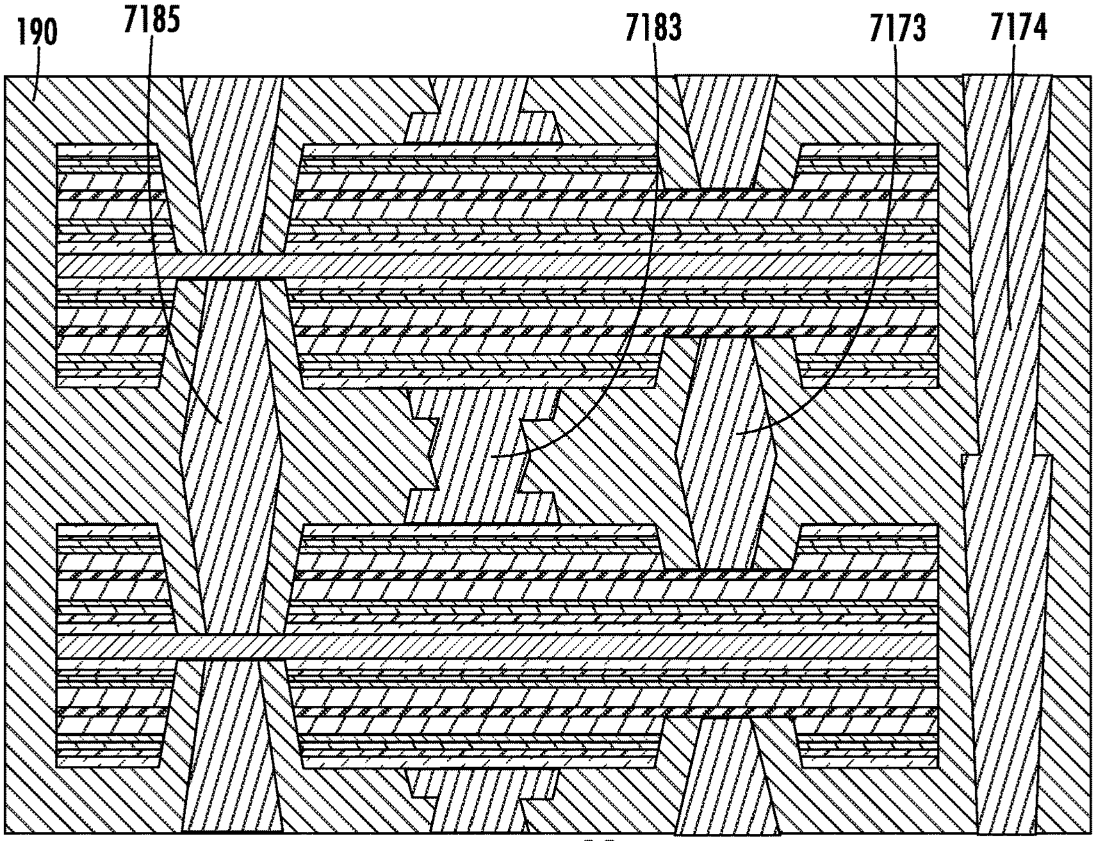
FIG. 32 is a cross-sectional view of another processing stage in manufacturing the IPD of FIG. 30.

FIG. 30 is a cross-sectional view of another IPD 7000 according to an embodiment of the present disclosure. FIGS. 31 and 32 are cross-sectional views of respective processing stages in manufacturing the IPD 7000 of FIG. 30. In this example, as shown in FIG. 31, the manufacturing process may begin with building the IPD 1000 (see FIG. 1) except without the metal contacts 170*b*, 180*b*, 170*a*, 180*a*. As described above, the capacitors 100*a*, 100*b* may thus be stacked (pre-integration) and bonded together by a conductive foil 160 (e.g., a copper foil or in some cases a paste, plate, etc.). Then, as shown in FIG. 32, an identically prepared IPD 1000 (again omitting the metal contacts 170*b*, 180*b*, 170*a*, 180*a*) may be stacked on the first and bonded using the conductive via fill according to the integration stage methodology described in relation to the IPD 4000 of FIGS. 18-20. That is, referring to FIGS. 31 and 32, the conductive via fill 172*b* of one IPD 1000 may be bonded to the conductive via fill 172*a* of the other IPD 1000 to form the (combined) conductive via fill 7173, the conductive via fill 182*b* of one IPD 1000 may be bonded to the conductive via fill 182*a* of the other IPD 1000 to form the conductive via fill 7183, and the conductive via fill 184*b* of one IPD 1000 may be bonded to the conductive via fill 184*a* of the other IPD 1000 to form the conductive via fill 7185. If included, the conductive via fill 174 of one IPD 1000 may be bonded to the conductive via fill 174 of the other IPD 1000 to likewise form the (combined) via fill 7174 for an additional passthrough connection as described above. Lastly, referring to FIG. 30, metal contacts 7170*b*, 7180*b*, 7170*a*, 7180*a* may be provided on the front and back outer surfaces 7002, 7004 of the IPD 7000.

Advantageously, the IPD 7000 may have a passthrough electrical connection from the metal contact 7180*b*, on the front outer surface 7002 of the IPD 7000 all the way to the metal contact 7180*a* on the back outer surface 7004 of the IPD 7000 by way of the conductive via fill 184*b*, the conductive via fill 7185, and the conductive via fill 184*a* and the two conductive foils 160. There may also be an additional passthrough electrical connection from the metal contact 7170*b* on the front outer surface 7002 to the metal contact 7170*a* on the back outer surface 7004 by way of the conductive via fill 7174.

Figure 33:
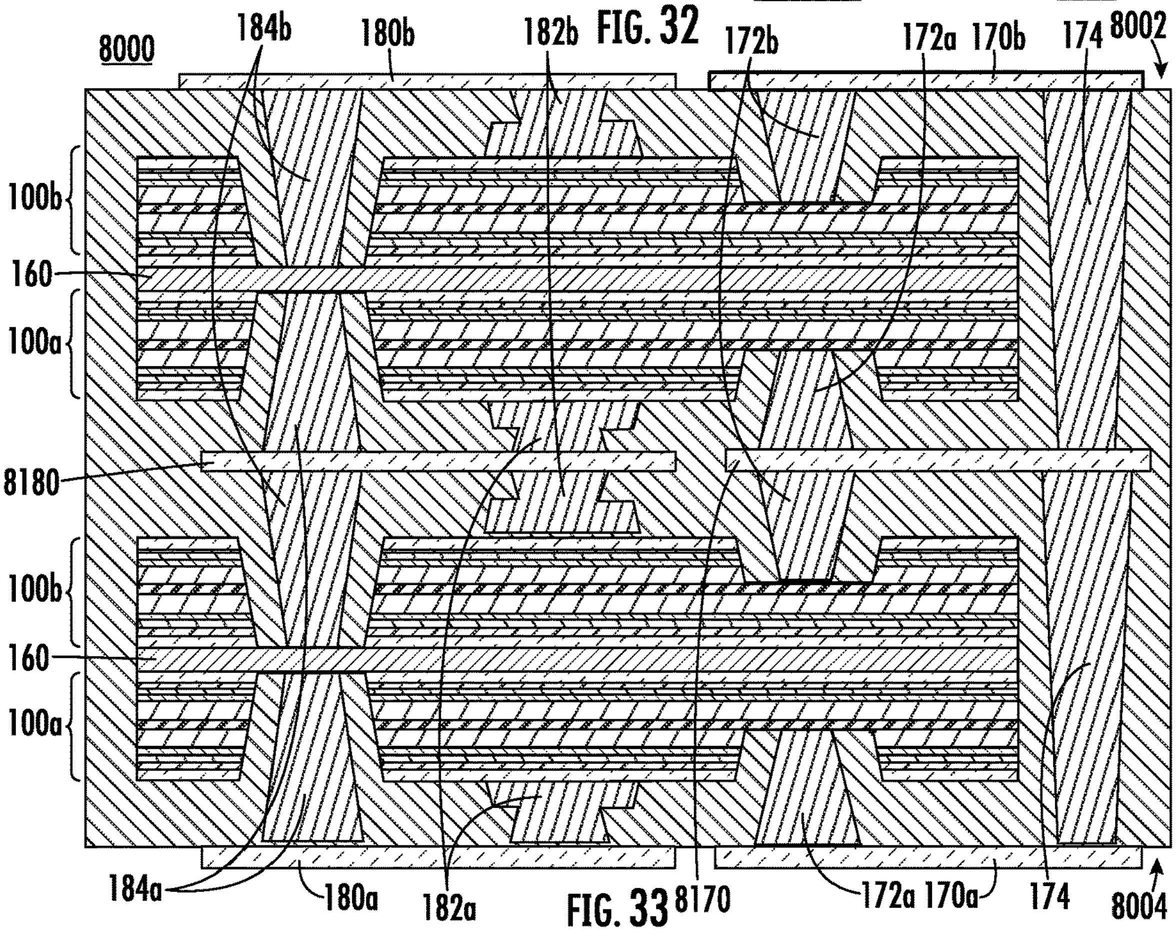
FIG. 33 is a cross-sectional view of another IPD according to an embodiment of the present disclosure.
Figure 34:
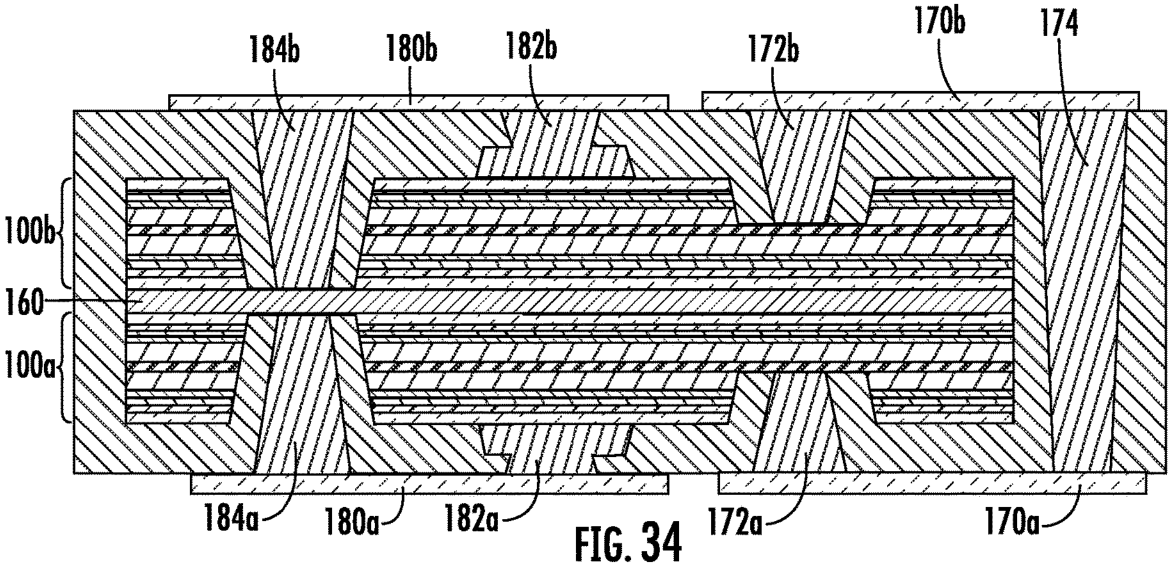
FIG. 34 is a cross-sectional view of a processing stage in manufacturing the IPD of FIG. 33.
Figure 35:
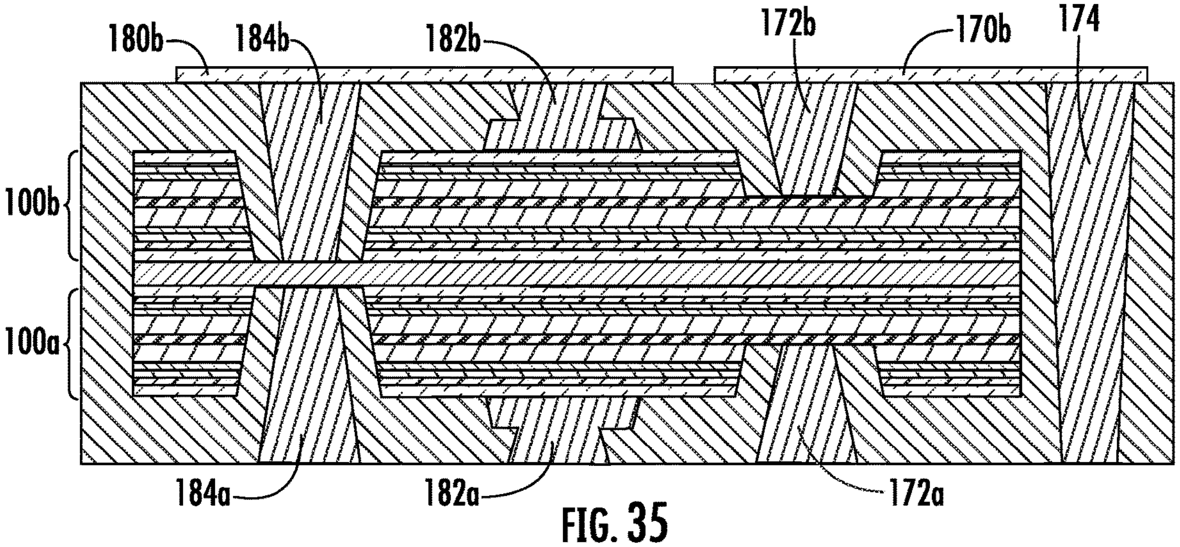
FIG. 35 is a cross-sectional view of another processing stage in manufacturing the IPD of FIG. 33.

FIG. 33 is a cross-sectional view of another IPD 8000 according to an embodiment of the present disclosure. FIGS. 34 and 35 are cross-sectional views of respective processing stages in manufacturing the IPD 8000 of FIG. 33. In this example, as shown in FIG. 34, the manufacturing process may begin with building the IPD 1000 (see FIG. 1), differing from the IPD 7000 in that even the metal contacts 170*b*, 180*b*, 170*a*, 180*a* of the IPD 1000 may be completed. Again, the capacitors 100*a*, 100*b* may be stacked (pre-integration) and bonded together by a conductive foil 160 (e.g., a copper foil or in some cases a paste, plate, etc.). Then, as shown in FIG. 35, another IPD 1000 may be prepared, except this time omitting metal contacts on one side (leaving only the metal contacts 170*b*, 180*b* in this example). Referring back to FIG. 33, the two IPDs 1000 may then be stacked and bonded using the conductive via fill and intervening metal contacts according to the integration stage methodology described in relation to the IPD 5000 of FIGS. 21-23. That is, the conductive via fill 172*a* of the IPD 1000 shown in FIG. 35 (with the back metal contacts omitted) may be bonded to the metal contact 170*b* of the IPD 1000 shown in FIG. 34, and the conductive via fills 182*a*, 184*a* of the IPD 1000 shown in FIG. 35 may be bonded to the metal contact 180*b* of the IPD 1000 shown in FIG. 34. Referring to FIG. 33, the intervening metal contacts 170*b*, 180*b* may now constitute metal contact layers 8170, 8180 surrounded by the insulating material 190 in the completed IPD 8000.

Advantageously, the IPD 8000 may have a passthrough electrical connection from the metal contact 180*b*, on the front outer surface 8002 of the IPD 8000 all the way to the metal contact 180*a* on the back outer surface 8004 of the IPD 8000 by way of the conductive via fill 184*b* of both constituent devices (the IPDs 1000 of FIGS. 34 and 35), the conductive via fill 184*a* of both constituent devices, the metal contact layer 8180, and the two conductive foils 160. There may also be an additional passthrough electrical connection from the metal contact 170*b* on the front outer surface 8002 to the metal contact 170*a* on the back outer surface 8004 by way of the conductive via fills 174 of both constituent devices and the metal contact layer 8170.

Figure 36:
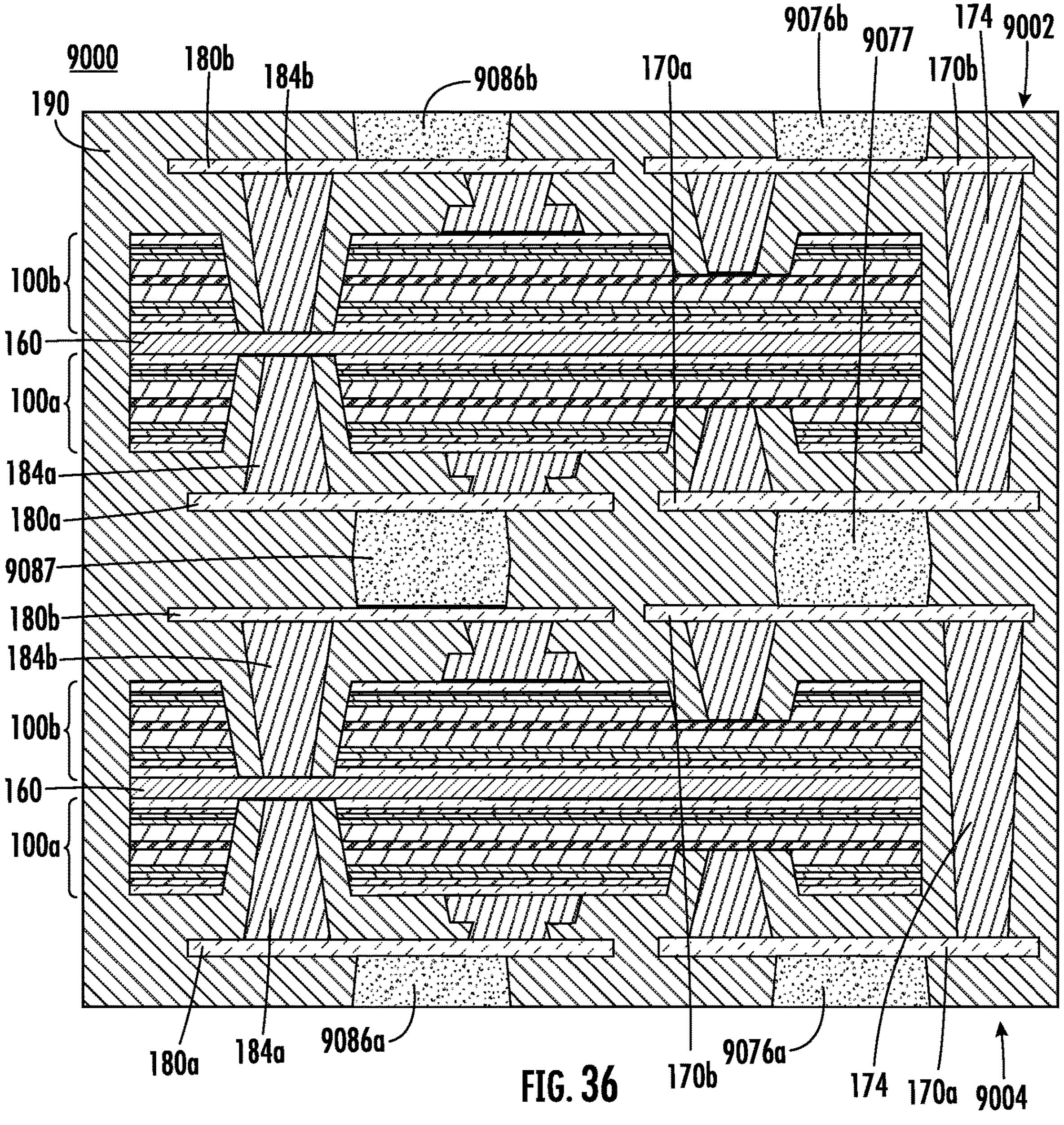
FIG. 36 is a cross-sectional view of another IPD according to an embodiment of the present disclosure.
Figure 37:
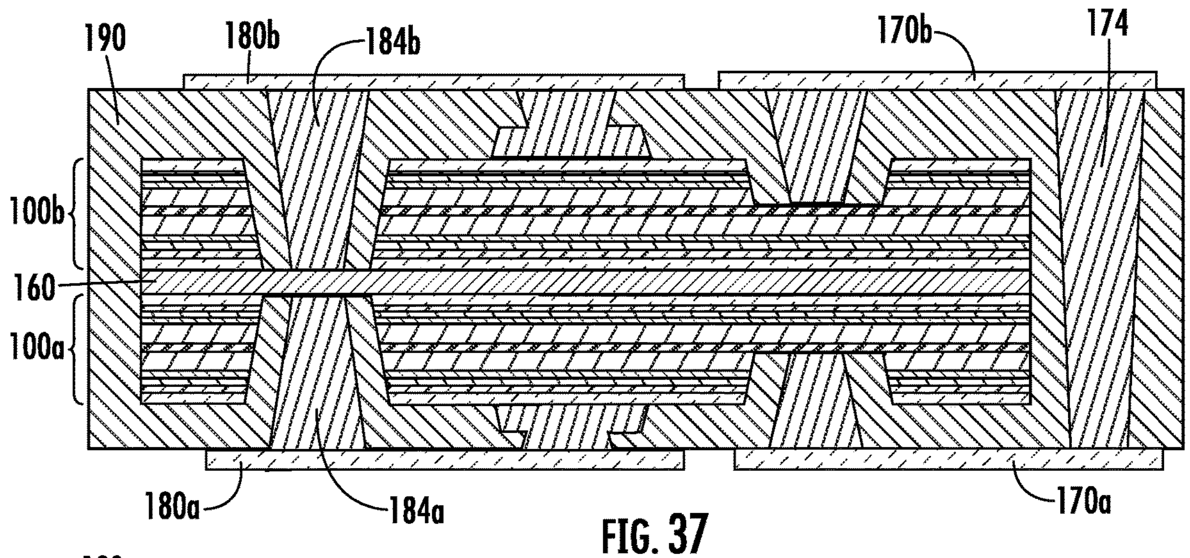
FIG. 37 is a cross-sectional view of a processing stage in manufacturing the IPD of FIG. 36.
Figure 38:
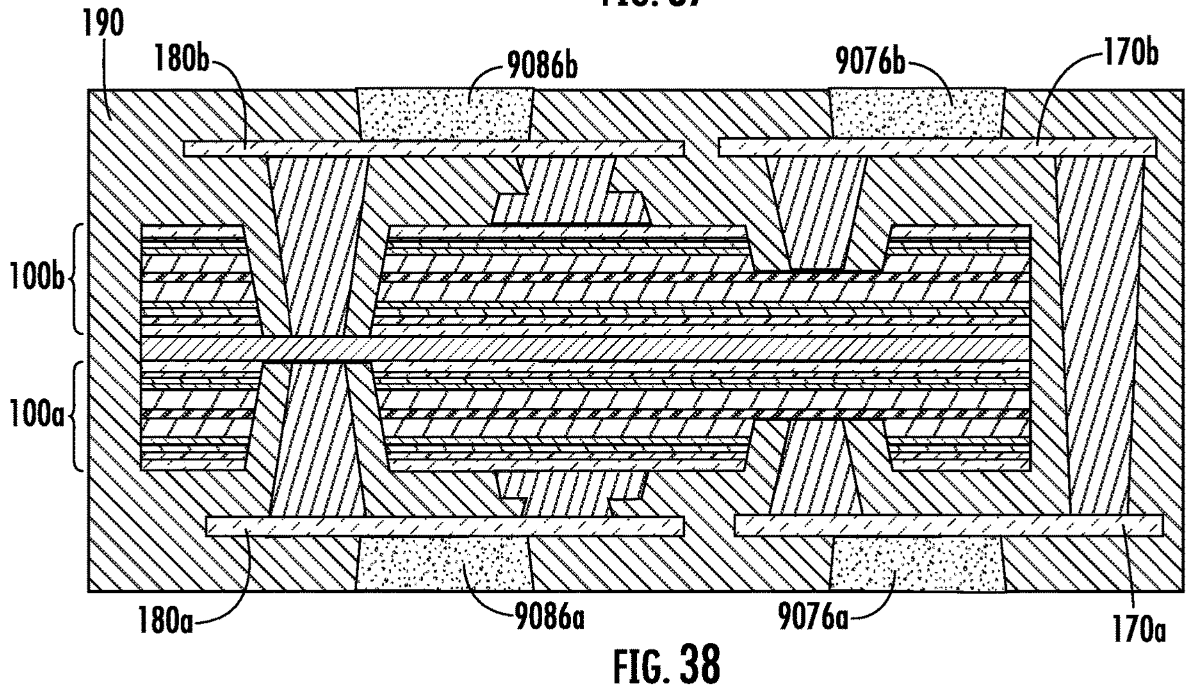
FIG. 38 is a cross-sectional view of another processing stage in manufacturing the IPD of FIG. 36.

FIG. 36 is a cross-sectional view of another IPD 9000 according to an embodiment of the present disclosure. FIGS. 37 and 38 are cross-sectional views of respective processing stages in manufacturing the IPD 9000 of FIG. 36. In this example, as shown in FIG. 37, the manufacturing process may again begin with building the IPD 1000 (see FIG. 1) as in the case of the IPD 8000. Again, the capacitors 100*a*, 100*b* may be stacked (pre-integration) and bonded together by a conductive foil 160 (e.g., a copper foil or in some cases a paste, plate, etc.). Then, as shown in FIG. 38, solder 9076*a*, 9076*b*, 9086*a*, 9086*ab* may be added respectively to the metal contacts 170*a*, 170*b*, 180*a*, 180*b* and surrounded by the insulating material 190. The processing steps of FIGS. 37 and 38 may then be identically repeated to produce a second IPD 1000 plus solder (optionally omitted from one side). The two IPDs 1000 may then be stacked and bonded according to the integration stage methodology described in relation to the IPD 6000 of FIGS. 24-26 to produce the IPD 9000 of FIG. 36. In FIG. 36, the combined solder 9077 represents the combination of solder 9076*a* applied to one of the constituent devices (i.e., the IPD 1000 shown in FIG. 37 and FIG. 38) with solder 9076*b* applied to the other of the constituent devices, while the combined solder 9087 represents the combination of solder 9086*a* applied to one of the constituent devices with solder 9086*b* applied to the other of the constituent devices. If solder is omitted from one side of one of the constituent devices, then the combined solder 9077 and the combined solder 9087 may each be simply one layer of solder bonded with the metal contact of the other constituent device.

Advantageously, the IPD 9000 may have a passthrough electrical connection from the solder 9086*b* on the front outer surface 9002 of the IPD 9000 all the way to the solder 9086*a* on the back outer surface 9004 of the IPD 9000 by way of the (now embedded) metal contact layers 180*b*, 180*a* of both constituent devices (the IPDs 1000 of FIGS. 37 and 38), the conductive via fills 184*b*, 184*a* of both constituent devices, and the two conductive foils 160. There may also be an additional passthrough electrical connection from the solder 9076*b* on the front outer surface 9002 of the IPD 9000 all the way to the solder 9076*a* on the back outer surface 9004 of the IPD 9000 by way of the (now embedded) metal contact layers 170*b*, 170*a* of both constituent devices and the conductive via fills 174 of both constituent devices.

Figure 39:
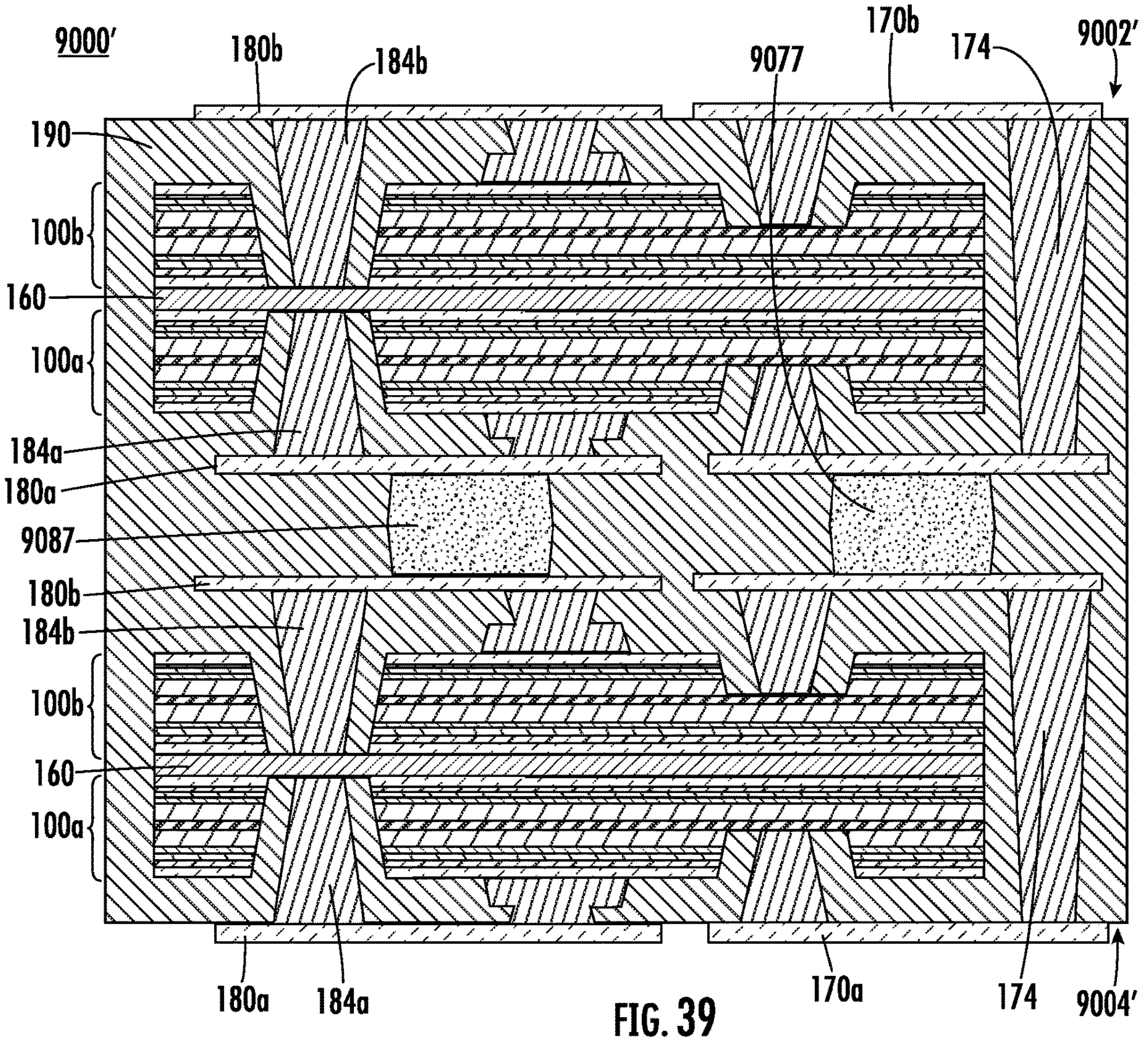
FIG. 39 is a cross-sectional view of another IPD according to an embodiment of the present disclosure.

FIG. 39 is a cross-sectional view of another IPD 9000' according to an embodiment of the present disclosure. The IPD 9000' may be the same as the IPD 9000 shown in FIG. 36 and may be made by the same processing steps described above in relation to FIGS. 37 and 38, differing only in the omission of the outermost solder 9076*b*, 9086*b*, 9076*a*, 9086*a* and the leaving of the metal contacts 170*b*, 180*b*, 170*a*, 180*a* exposed (i.e., not embedded in the insulating material 190). As such, the two constituent IPDs 1000 making up the IPD 9000' may then be stacked and bonded according to the integration stage methodology described in relation to the IPD 6000' of FIGS. 27-29 (with solder being selectively applied only where the constituent devices will abut each other). As may be appreciated, the IPD 9000' may still have a passthrough electrical connection from the metal contact layer 180*b* on the front outer surface 9002' of the IPD 9000' all the way to the metal contact layer 180*a* on the back outer surface 9004' of the IPD 9000' by way of the remaining embedded metal contact layers 180*b*, 180*a*, conductive via fills 184*b*, 184*a*, and conductive foils 160. There may also be an additional passthrough electrical connection from the metal contact 170*b* on the front outer surface 9002' of the IPD 9000' all the way to the metal contact 170*a* on the back outer surface 9004' of the IPD 9000' by way of the remaining embedded metal contact layers 170*b*, 170*a* and the conductive via fills 174. As described above in relation to the IPD 6000', the IPD 9000' may have shorter path lengths than the IPD 9000, as well as fewer interfaces that could potentially lead to failure in solder joints, making the IPD 9000' potentially more reliable than the IPD 9000.

The examples of FIGS. 30-39 represent only a few examples of hybrid stacks incorporating the pre-integration methodologies of the IPD 1000. However, it is also contemplated that the pre-integration methodologies of the IPDs 1000', 2000, and 3000 may also be incorporated into such hybrid stacks, in combination with any of the integration stage stacking methodologies of the IPDs 4000, 5000, 6000, and 6000' or variants thereof. It should also be noted that, just as the IPDs 1000, 1000', 2000, 3000, 4000, 5000, 6000, 6000' may each individually include additional stacked capacitors as noted above, the hybrid IPDs 7000, 8000, 9000, 9000' may likewise be expanded vertically using various combinations of pre-integration and integration methodologies described herein or variants thereof.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. An integrated passive device comprising:

a first capacitor including a conductive substrate having a front side and a back side, a front dielectric layer on the front side of the conductive substrate, a back dielectric layer on the back side of the conductive substrate, a front conductive polymer layer on the front dielectric layer, and a back conductive polymer layer on the back dielectric layer;

a second capacitor stacked on the first capacitor, the second capacitor including a conductive substrate having a front side and a back side, a front dielectric layer on the front side of the conductive substrate, a back dielectric layer on the back side of the conductive substrate, a front conductive polymer layer on the front dielectric layer, and a back conductive polymer layer on the back dielectric layer;

a first metal contact electrically connected to one or both of the conductive substrates of the first and second capacitors;

a second metal contact electrically isolated from the first metal contact and electrically connected to the front and back conductive polymer layers of the first and second capacitors; and a passthrough electrical connection between a front outer surface of the integrated passive device and a back outer surface of the integrated passive device opposite the front outer surface;

wherein the first and second capacitors are bonded together by a conductive foil provided therebetween, and the passthrough electrical connection comprises a first blind via extending from the front outer surface to a front side of the conductive foil and a second blind via extending from the back outer surface to a back side of the conductive foil.

2. The integrated passive device of claim 1, wherein the first capacitor further includes a front metallization layer arranged to promote electrical conductivity between the front conductive polymer layer of the first capacitor and the second metal contact, the first capacitor further includes a back metallization layer arranged to promote electrical conductivity between the back conductive polymer layer of the first capacitor and the second metal contact, the second capacitor further includes a front metallization layer arranged to promote electrical conductivity between the front conductive polymer layer of the second capacitor and the second metal contact, the second capacitor further includes a back metallization layer arranged to promote electrical conductivity between the back conductive polymer layer of the second capacitor and the second metal contact, and the conductive foil is arranged to bond the front metallization layer of the first capacitor to the back metallization layer of the second capacitor.

3. The integrated passive device of claim 2, wherein the first capacitor further includes a front carbonaceous layer on the front conductive polymer layer and a back carbonaceous layer on the back conductive polymer layer, the second capacitor further includes a front carbonaceous layer on the front conductive polymer layer and a back carbonaceous layer on the back conductive polymer layer, and, in each of the first and second capacitors, the front metallization layer is on the front carbonaceous layer and the back metallization layer is on the back carbonaceous layer.

4. The integrated passive device of claim 1, wherein the second metal contact is provided on the front outer surface of the integrated passive device and is electrically connected to the back conductive polymer layer of the first capacitor by way of the conductive foil, and the passthrough connection comprises the second metal contact and the conductive foil.

5. The integrated passive device of claim 1, further comprising an additional passthrough electrical connection between the front outer surface of the integrated passive device and the back outer surface of the integrated passive device opposite the front outer surface, the additional passthrough electrical connection comprising a through via electrically connected to the first metal contact.

6. An integrated passive device comprising:

a first capacitor including a conductive substrate having a front side and a back side, a front dielectric layer on the front side of the conductive substrate, a back dielectric layer on the back side of the conductive substrate, a front conductive polymer layer on the front dielectric layer, and a back conductive polymer layer on the back dielectric layer;

a second capacitor stacked on the first capacitor, the second capacitor including a conductive substrate having a front side and a back side, a front dielectric layer on the front side of the conductive substrate, a back dielectric layer on the back side of the conductive substrate, a front conductive polymer layer on the front dielectric layer, and a back conductive polymer layer on the back dielectric layer;

a first metal contact electrically connected to one or both of the conductive substrates of the first and second capacitors;

a second metal contact electrically isolated from the first metal contact and electrically connected to the front and back conductive polymer layers of the first and second capacitors;

a passthrough electrical connection between a front outer surface of the integrated passive device and a back outer surface of the integrated passive device opposite the front outer surface; and a first metallization layer arranged to promote electrical conductivity between the front conductive polymer layer of the first capacitor and the second metal contact and to promote electrical conductivity between the back conductive polymer layer of the second capacitor and the second metal contact, the first and second capacitors being bonded together by the first metallization layer;

wherein each of the first and second capacitors further includes a sidewall dielectric layer on a sidewall of the conductive substrate, the sidewall dielectric layer connecting the front and back dielectric layers;

wherein the integrated passive device further comprises a termination pad that extends along the sidewall dielectric layers of the first and second capacitors, the second metal contact being electrically connected to the first metallization layer by way of the termination pad;

wherein the integrated passive device further comprises an additional passthrough electrical connection between the front outer surface of the integrated passive device and the back outer surface of the integrated passive device opposite the front outer surface, the additional passthrough electrical connection comprising a first blind via extending from the front outer surface to the termination pad and a second blind via extending from the back outer surface to the termination pad.

7. The integrated passive device of claim 6, wherein the first capacitor further includes a front carbonaceous layer on the front conductive polymer layer, the second capacitor further includes a back carbonaceous layer on the back conductive polymer layer, and the first metallization layer is on the front carbonaceous layer of the first capacitor and on the back carbonaceous layer of the second capacitor.

8. The integrated passive device of claim 6, further comprising:

a third capacitor stacked underneath the first capacitor, the third capacitor including a conductive substrate having a front side and a back side, a front dielectric layer on the front side of the conductive substrate, a back dielectric layer on the back side of the conductive substrate, a front conductive polymer layer on the front dielectric layer, and a back conductive polymer layer on the back dielectric layer, the first metal contact being electrically connected to the conductive substrates of the first, second, and third capacitors, the second metal contact being electrically connected to the front and back conductive polymer layers of the first, second, and third capacitors; and a second metallization layer arranged to promote electrical conductivity between the back conductive polymer layer of the first capacitor and the second metal contact and to promote electrical conductivity between the front conductive polymer layer of the third capacitor and the second metal contact, the first and third capacitors being bonded together by the second metallization layer.

9. The integrated passive device of claim 8, wherein the first capacitor further includes a front carbonaceous layer on the front conductive polymer layer and a back carbonaceous layer on the back conductive polymer layer, the second capacitor further includes a back carbonaceous layer on the back conductive polymer layer, the third capacitor further includes a front carbonaceous layer on the front conductive polymer layer, the first metallization layer is on the front carbonaceous layer of the first capacitor and on the back carbonaceous layer of the second capacitor, and the second metallization layer is on the back carbonaceous layer of the first capacitor and on the front carbonaceous layer of the third capacitor.

10. The integrated passive device of claim 6, wherein the passthrough electrical connection comprises a through via extending through said one or both of the conductive substates of the first and second capacitors.

11. The integrated passive device of claim 10, wherein the through via is electrically connected to the first metal contact.

12. The integrated passive device of claim 6, wherein the additional through via is electrically connected to the second metal contact.

13. An integrated passive device comprising:

a first capacitor including a conductive substrate, a dielectric layer on the conductive substrate, and a conductive polymer layer on the dielectric;

a second capacitor stacked on the first capacitor, the second capacitor including a conductive substrate, a dielectric layer on the conductive substrate, and a conductive polymer layer on the dielectric;

a first metal contact electrically connected to one or both of the conductive substrates of the first and second capacitors;

a second metal contact electrically isolated from the first metal contact and electrically connected to the conductive polymer layers of the first and second capacitors; and a passthrough electrical connection between a front outer surface of the integrated passive device and a back outer surface of the integrated passive device opposite the front outer surface;

wherein the first and second capacitors are bonded together by a conductive foil provided therebetween, and the passthrough electrical connection comprises a first blind via extending from the front outer surface to a front side of the conductive foil and a second blind via extending from the back outer surface to a back side of the conductive foil.

14. The integrated passive device of claim 13, wherein the first capacitor further includes a metallization layer arranged to promote electrical conductivity between the conductive polymer layer of the first capacitor and the second metal contact, the second capacitor further includes a metallization layer arranged to promote electrical conductivity between the conductive polymer layer of the second capacitor and the second metal contact.

15. The integrated passive device of claim 14, wherein the conductive foil is arranged to bond the metallization layer of the first capacitor to the metallization layer of the second capacitor.

16. The integrated passive device of claim 14, wherein the first capacitor further includes a carbonaceous layer on the conductive polymer layer, the second capacitor further includes a carbonaceous layer on the conductive polymer layer, and, in each of the first and second capacitors, the metallization layer is on the carbonaceous layer.

17. The integrated passive device of claim 13, wherein the second metal contact is provided on the front outer surface of the integrated passive device and is electrically connected to the conductive polymer layer of the first capacitor by way of the conductive foil, and the passthrough connection comprises the second metal contact and the conductive foil.

18. The integrated passive device of claim 13, further comprising an additional passthrough electrical connection between the front outer surface of the integrated passive device and the back outer surface of the integrated passive device opposite the front outer surface, the additional passthrough electrical connection comprising a through via.

19. The integrated passive device of claim 18, wherein the through via is electrically connected to the first metal contact.

* * * * *